US012348257B2

(12) United States Patent
Cho et al.

(10) Patent No.: US 12,348,257 B2
(45) Date of Patent: Jul. 1, 2025

(54) ELECTRONIC DEVICE FOR CONTROLLING WIRELESS TRANSMISSION AND OPERATING METHOD THEREOF

(71) Applicant: SAMSUNG ELECTRONICS CO., LTD., Suwon-si (KR)

(72) Inventors: Namjun Cho, Suwon-si (KR); Jihee Kang, Suwon-si (KR); Hyoseok Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 18/086,854

(22) Filed: Dec. 22, 2022

(65) Prior Publication Data

US 2023/0283314 A1    Sep. 7, 2023

Related U.S. Application Data

(63) Continuation of application No. PCT/KR2022/020096, filed on Dec. 12, 2022.

(30) Foreign Application Priority Data

Mar. 7, 2022   (KR) .................. 10-2022-0028673
Apr. 13, 2022  (KR) .................. 10-2022-0045863

(51) Int. Cl.
    *H04W 52/18*    (2009.01)
    *H04B 1/3827*   (2015.01)
    *H04W 52/38*    (2009.01)

(52) U.S. Cl.
    CPC .......... *H04B 1/3838* (2013.01); *H04W 52/18* (2013.01); *H04W 52/38* (2013.01)

(58) Field of Classification Search
    CPC ... H04B 1/3827; H04B 1/3838; H04W 52/38; H04W 52/18
    See application file for complete search history.

(56) References Cited

U.S. PATENT DOCUMENTS 8,199,062 B2 *  6/2012  Johnson ................. H01Q 1/246
                                                  343/797
8,781,420 B2    7/2014  Schlub et al.
(Continued)

FOREIGN PATENT DOCUMENTS

KR         10-1417560 B1    7/2014
KR      10-2018-0025710 A   3/2018
(Continued)

OTHER PUBLICATIONS

International Search Report dated Apr. 5, 2023 for Application No. PCT/KR2022/020096.
(Continued)

*Primary Examiner* — Hai V Nguyen
(74) *Attorney, Agent, or Firm* — Nixon & Vanderhye P.C.

(57) ABSTRACT

An electronic device may include an antenna, a power amplifier (PA) to transmit an output signal to the antenna through a signal path, a coupler to obtain a first signal coupled to the output signal and a second signal coupled to a reflection signal of the output signal reflected from the antenna, an equalizing module to generate a changed signal obtained by changing a strength and/or a phase of one signal of the first signal or the second signal, a differential circuit to generate a differential signal between a remaining one signal of the first signal or the second signal and the changed signal, and a controller to control transmitting of a radio signal, based on the differential signal. Moreover, various embodiment found through the disclosure are possible.

20 Claims, 19 Drawing Sheets

(56) References Cited

U.S. PATENT DOCUMENTS

| | | | |
|---|---|---|---|
| 9,197,271 B2 | 11/2015 | Peter | |
| 9,312,592 B2 | 4/2016 | Noe | |
| 9,537,516 B1* | 1/2017 | Ryu | H04B 1/04 |
| 9,769,769 B2* | 9/2017 | Harper | H04B 17/13 |
| 9,835,714 B2 | 12/2017 | Dandu et al. | |
| 10,038,247 B2* | 7/2018 | DeLisio, Jr. | H01P 5/107 |
| 10,177,455 B2* | 1/2019 | DeLisio, Jr. | H03F 3/24 |
| 10,256,854 B1* | 4/2019 | Srinivasan | H03F 3/45636 |
| 10,840,962 B2 | 11/2020 | Kim | |
| 11,336,237 B2 | 5/2022 | Dani | |
| 11,360,200 B2* | 6/2022 | VanNeste | G01S 5/14 |
| 11,424,539 B2 | 8/2022 | Alpman et al. | |
| 11,483,186 B2* | 10/2022 | Casper | H04L 25/03847 |
| 11,536,759 B2* | 12/2022 | Strutt | H04B 1/3838 |
| 11,668,807 B2* | 6/2023 | VanNeste | G01S 5/14 |
| | | | 342/125 |
| 12,000,929 B2* | 6/2024 | Madrigal | G01S 7/523 |
| 12,047,137 B2* | 7/2024 | Na | G06V 10/17 |
| 2003/0103445 A1* | 6/2003 | Steer | H04L 27/26035 |
| | | | 370/335 |
| 2008/0226301 A1* | 9/2008 | Alic | H04B 10/541 |
| | | | 398/158 |
| 2009/0267856 A1* | 10/2009 | Schadler | H01Q 21/26 |
| | | | 343/797 |
| 2013/0195455 A1* | 8/2013 | Jansen | H04B 10/548 |
| | | | 398/65 |
| 2013/0210477 A1 | 8/2013 | Peter | |
| 2014/0266499 A1 | 9/2014 | Noe | |
| 2015/0249916 A1* | 9/2015 | Schlub | H04W 8/22 |
| | | | 455/419 |
| 2015/0372656 A1* | 12/2015 | Mow | H03H 7/38 |
| | | | 455/77 |
| 2015/0382307 A1* | 12/2015 | Harper | H04B 7/022 |
| | | | 455/127.1 |
| 2016/0156490 A1* | 6/2016 | Tarighat Mehrabani | |
| | | | H04B 7/0408 |
| | | | 455/23 |
| 2016/0299215 A1 | 10/2016 | Dandu et al. | |
| 2016/0329967 A1* | 11/2016 | Yu | G02F 1/2255 |
| 2016/0373064 A1* | 12/2016 | Lin | H04W 52/38 |
| 2017/0005412 A1* | 1/2017 | DeLisio, Jr. | H03F 3/602 |
| 2017/0117875 A1* | 4/2017 | Nomura | H03H 9/058 |
| 2018/0013457 A1* | 1/2018 | Wang | H04B 1/1607 |
| 2018/0062684 A1* | 3/2018 | Kim | H01Q 1/245 |
| 2018/0262163 A1* | 9/2018 | Tokuda | G05F 3/26 |
| 2018/0262166 A1* | 9/2018 | Takagi | H03F 3/245 |
| 2018/0358705 A1* | 12/2018 | DeLisio, Jr. | H01P 5/107 |
| 2020/0044612 A1 | 2/2020 | Bologna et al. | |
| 2020/0091608 A1 | 3/2020 | Alpman et al. | |
| 2020/0099350 A1 | 3/2020 | Dani | |
| 2021/0168000 A1* | 6/2021 | Casper | H03F 3/193 |
| 2022/0345167 A1* | 10/2022 | Yang | H04B 1/3827 |
| 2024/0097729 A1* | 3/2024 | Adnan | H01P 5/10 |

FOREIGN PATENT DOCUMENTS

| | | |
|---|---|---|
| KR | 10-2317692 B1 | 10/2021 |
| KR | 10-2022-0003309 A | 1/2022 |
| WO | WO 2015-195269 A1 | 12/2015 |

OTHER PUBLICATIONS

Extended European Search Report dated May 27, 2025 for EP Application No. 22931132.9.

* cited by examiner

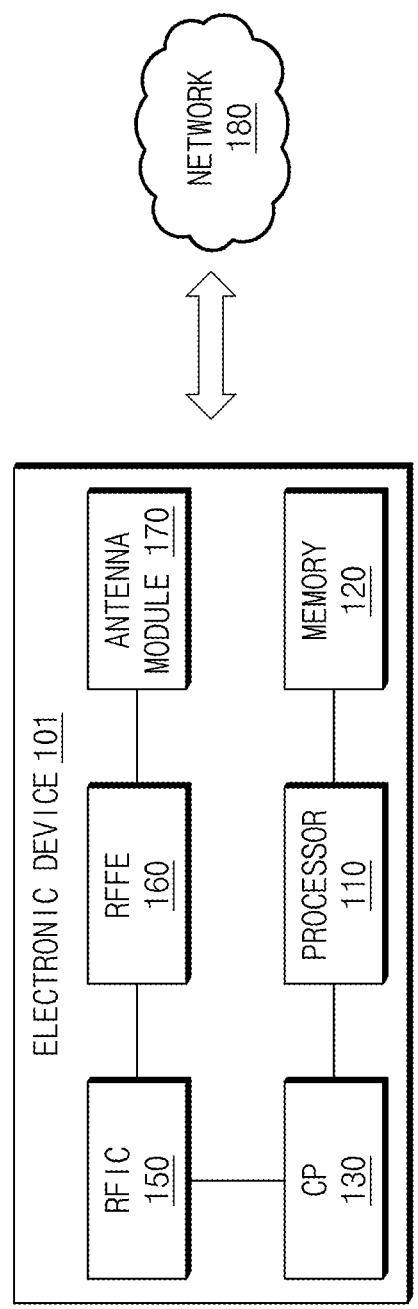

ELECTRONIC DEVICE FOR CONTROLLING WIRELESS TRANSMISSION AND OPERATING METHOD THEREOF

CROSS-REFERENCE TO RELATED APPLICATIONS

This application is a continuation of International Application No. PCT/KR2022/020096, filed on Dec. 12, 2022, designating the United States, in the Korean Intellectual Property Receiving Office, and claiming priority to Korean Patent Application No. 10-2022-0028673, filed on Mar. 7, 2022, and to Korean Patent Application No. 10-2022-0045863, filed on Apr. 13, 2022, in the Korean Intellectual Property Office, the disclosures of which are all hereby incorporated by reference herein in their entireties.

BACKGROUND

Field

Various example embodiments relate to an electronic device capable of controlling wireless transmission, and/or an operating method thereof.

Description of Related Art

For a signal of a mmWave band, a human hazard is determined by power per unit area ($W/m^2$; power density; PD) on the surface of a human body. For example, the power of a whole surface of the electronic device is measured in the unit of 4 $cm^2$ at a point spaced apart from the surface of the electronic device by 2 mm. When the measured power density does not exceed a reference value (e.g., 10 $W/m^2$), it is evaluated that human harm standard for an electronic device is satisfied.

When the measured power density of the electronic device exceeds the reference value, the radio signal may be transmitted at a power lower than the maximum output of the electronic device. In this case, the coverage of the radio signal using the mmWave-band signal significantly greatly showing the signal attenuation depending on the distance may be reduced.

Accordingly, to overcome the restriction of effective isotropic radiated power (EIRP), there is present a back-off manner of the maximum or high EIRP depending on the proximity state of the human body.

SUMMARY

To detect the proximity state of the human body, an additional sensor(s) (e.g., the proximity sensor) can be provided in the electronic device.

Accordingly, there is desirable a manner of detecting the proximity state of the human body through a communication module for mmWave communication.

According to an example embodiment, an electronic device may include an antenna, a power amplifier (PA) to transmit an output signal to the antenna through a signal path, a coupler to obtain a first signal coupled to the output signal and a second signal coupled to a reflection signal of the output signal reflected from the antenna, an equalizing module (or an equalizing circuit) (comprising circuitry) to generate a changed signal obtained by changing a size and/or a phase of one signal of the first signal or the second signal, a differential circuit to generate a differential signal between at least a remaining one signal of the first signal or the second signal and the changed signal, and a controller (or at least one processor), comprising processing circuitry, configured to control transmitting of a radio signal, based on the differential signal.

According to an example embodiment, a method for operating an electronic device, may include acquiring a first signal coupled to an output signal transmitted to an antenna through a signal path, acquiring a second signal coupled to a reflection signal of the output signal, which is reflected from the antenna, generating a changed signal obtained by changing a size and/or a phase of one signal of the first signal or the second signal, generating a differential signal between at least a remaining one signal of the first signal or the second signal and the changed signal, and controlling transmitting of a radio signal, based on the differential signal.

According to an example embodiment, in the electronic device and the method for operating the same, the transmitting of the radio signal may be controlled depending on the proximity state of the human body without the additional sensor (e.g., the proximity sensor).

BRIEF DESCRIPTION OF THE DRAWINGS

The above and other aspects, features, and advantages of certain example embodiments of the present disclosure will be more apparent from the following detailed description, taken in conjunction with the accompanying drawings, in which:

FIG. 1A is a block diagram of an electronic device, according to an example embodiment;

With regard to description of drawings, the same or similar components will be marked by the same or similar reference signs.

DETAILED DESCRIPTION

Figure 1B:
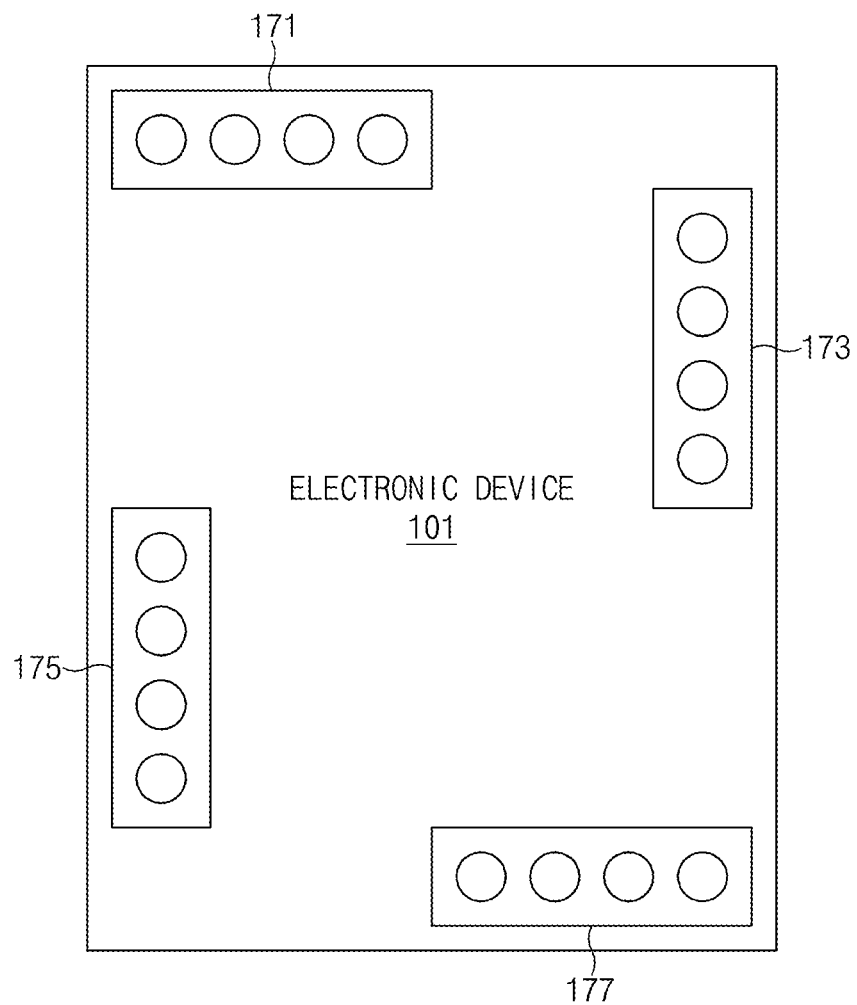
FIG. 1B illustrates positions of array antennas of an electronic device, according to an example embodiment.

FIG. 1A is a block diagram of an electronic device 101, according to an example embodiment. FIG. 1B illustrates positions of array antennas of an electronic device according to an example embodiment.

Referring to FIG. 1A, the electronic device 101 may include a processor 110, a communication processor (CP) 130, memory 120, a radio frequency integrated circuit (RFIC) 150, a radio frequency front end (RFFE) 160, and an antenna module 170. Each "processor" and "controller" herein comprises processing circuitry.

For example, the processor 110 may execute a software to control at least one of another component (e.g., hardware or software component) connected to the processor 110 and may process and compute various data.

The communication processor 130 may establish a communication channel for a band to be used for wireless communication with a network 180 and may support network communication through the established communication channel. The communication processor 130 may be operated independently from the processor 110.

The RFIC 150 may down-convert a radio frequency (RF) signal into an intermediate frequency (IF) signal and/or a baseband frequency signal. According to an embodiment, the RFIC 150 may up-convert the intermediate frequency (IF) signal and/or the baseband frequency from the communication processor 130 into a radio frequency signal.

The RFFE 160 may amplify a transmit signal (or an output signal) from the RFIC 150 and/or change the phase of the transmit signal, and then may transmit the transmit signal to the antenna module 170. In addition, the RFFE 160 may amplify a receive signal received from the antenna module 170 and/or change the phase of the receive signal, and then may transmit the receive signal to the RFIC 150.

The antenna module 170 may be an array antenna including a plurality of antennas. Each antenna module herein comprises at least one antenna.

Referring to FIG. 1B, the antenna module 170 may include a plurality of array antennas 171, 173, 175, and 177. A plurality of array antennas 171, 173, 175, and 177 may be physically spaced apart from each other and disposed in the electronic device 101.

Figure 2:
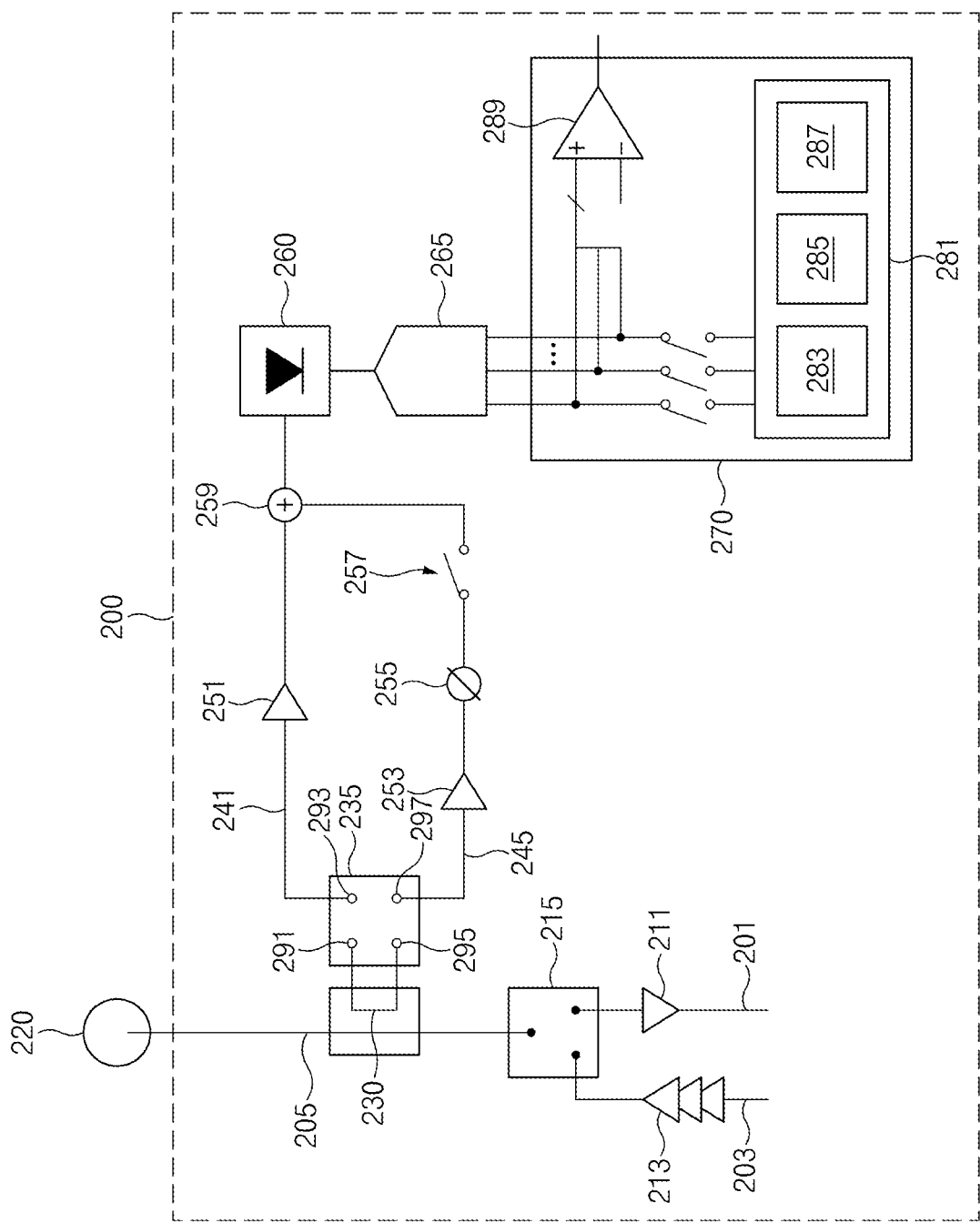
FIG. 2 illustrates an RFFE and an antenna of an electronic device, according to an example embodiment.

FIG. 2 illustrates an RFFE 200 and an antenna 220 of an electronic device, according to an example embodiment.

Referring to FIG. 2, the RFFE 200 may include an amplifier 211, an amplifier 213, a switch 215, a coupler 230, a switch 235, an amplifier 251, an amplifier 253, a phase shifter 255, a switch 257, a differential circuit 259, a power detector 260, an analog to digital converter (ACC) 265, and a controller 270. Hereinafter, the amplifier 211, the amplifier 213, the switch 215, the coupler 230, the switch 235, the amplifier 251, the amplifier 253, the phase shifter 255, the switch 257, and the differential circuit 259 may be referred to as a circuit module. Hereinafter, the amplifier 251, the amplifier 253, the phase shifter 255, and the switch 257 may be referred to as an equalizing module.

Circuit elements may be further included in the RFFE 200 of FIG. 2. For example, a phase shifter may be further provided on a receive path 201 and/or a transmit path 203.

According to an embodiment, the RFFE 200 may correspond to the RFFE 160 of FIG. 1. According to an embodiment, the antenna 220 may be referred to as one antenna of a plurality of antennas included in one array antenna among the plurality of array antennas 171, 173, 175, and 177 of FIG. 1.

The amplifier 211 may amplify the strength of the receive signal on the receive path 201 and transmit the amplified receive signal to an RFIC (e.g., RFIC 150 in FIG. 1). The amplifier 213 may amplify the strength of the transmit signal (or an output signal) on the transmit path 203 and transmit the amplified transmit signal to the antenna 220 through the switch 215.

The switch 215 may connect a signal path 205 to the receive path 201 to electrically connect the antenna 220 to the amplifier 211, or may connect the signal path 205 to the transmit path 203 to electrically connect the antenna 220 to the amplifier 213.

The coupler 230 may obtain a coupled signal which is coupled to a signal on the signal path 205. According to an embodiment, the coupled signal may include a first signal coupled to the transmit signal and a second signal coupled to a reflection signal of the transmit signal reflected from the antenna 220.

A leakage signal may be generated due to the physical characteristic (e.g., coupler isolation) of the coupler 230. According to an embodiment, as the transmit signal leaks due to the physical characteristic of the coupler 230, a first leakage signal may be generated. According to an embodiment, as the reflection signal leaks due to the physical characteristic of the coupler 230, a second leakage signal may be generated.

Although the first signal and the first leakage signal are generated based on the same transmit signal, the first signal and the first leakage signal may have mutually different strengths and mutually different forward directions. According to an embodiment, the strength of the first signal may be stronger than that of the first leakage signal. Although the second signal and the second leakage signal are generated based on the same reflection signal, the second signal and the second leakage signal may have mutually different strengths and mutually different forward directions. According to an embodiment, the strength of the second signal may be stronger than that of the second leakage signal.

The first signal and the second leakage signal may be transmitted through the same signal path, and the second signal and the first leakage signal may be transmitted through the same signal path, due to the physical characteristic of the coupler 230. In the following description, the second leakage signal may be omitted, because the strength of the second leakage signal is remarkably smaller than the strength of the first signal due to the coupling ratio and the coupling isolation The switch 235 may transmit the coupled signal to a first signal path 241 and/or a second signal path 245. According to an embodiment, the switch 235 may be a double pole double throw (DPDT) switch. For example, the switch 235 may connect a first input terminal 291 to a first output terminal 293, and connect a second input terminal 295 to a second output terminal 297 (which is referred to as a first switching connection hereinafter), or may connect the first input terminal 291 to the second output terminal 297, and connect the second input terminal 295 to the first output terminal 293 (which is referred as a second switching connection hereinafter). The switch 235 may transmit the coupled signal to the first signal path 241 and/or the second signal path 245 through the first switching connection.

The amplifier 251 may amplify the strength of the coupled signal on the first signal path 241, and may transmit the amplified coupled signal to the differential circuit 259.

The amplifier 253 may amplify the strength of the coupled signal on the second signal path 245, and may transmit the amplified coupled signal to the phase shifter 255.

The phase shifter 255 may change the phase of the amplified coupled signal and transmit a phase-changed coupled signal to the differential circuit 259 through the switch 257.

The differential circuit 259 may generate a differential signal between the coupled signal transmitted through the first signal path 241 and the coupled signal transmitted through the second signal path 245. For example, the differential circuit 259 may generate the differential signal by subtracting the coupled signal, which is transmitted through the second signal path 245, from the coupled signal, which is transmitted through the first signal path 241, The differential circuit 259 may transmit the generated differential signal to the power detector 260.

The power detector 260 may detect the strength (or amplitude) and/or normalized strength (or amplitude) of the differential signal received from the differential circuit 259. According to an embodiment, the normalized strength may be a value obtained by dividing the strength $P_{Diff}$ of the differential signal by the strength of the transmit signal $P_{TX}$.

According to an embodiment, the power detector 260 may be an envelope detector.

The power detector 260 may transmit the normalized strength of the differential signal to the ADC 265.

The ADC 265 may convert the normalized strength of the differential signal received from the power detector 260 into a digital signal.

The controller 270 may control the components of the RFFE 200, based on the digital signal. For example, the controller 270 may adjust parameters (e.g., a gain, or amplification degree) associated with the amplifiers 213, 251, and 253.

For another example, the controller 270 may adjust a parameter (e.g., phase shift) associated with the phase shifter 255.

The controller 270 may include a control circuit 281 to control the amplifiers 213, 251, and 253 and/or the phase shifter 255 depending on parameters. The control circuit 281 may include a closed loop power control (CLPC) circuit 283, a parameter control circuit 285, and a memory 287.

The CLPC circuit 283 may adjust the gain (or amplification degree) of the amplifiers 213 and 251 based on the digital signal, during the CLPC operation.

The parameter control circuit 285 may adjust the gain (or the application degree) of the amplifiers 251 and 253, based on a digital signal, and may adjust the phase shift of the phase shifter 255, based on the digital signal, during an operation of detecting an event.

The memory 287 may store a parameter for adjusting the gain (or amplification degree) of the amplifiers 251 and 253 and a parameter for adjusting the phase shift of the phase shifter 255. According to an embodiment, the memory 287 may store the parameters for adjusting the gain (or amplification degree) of the amplifier 251 and the amplifier 253 as different parameters or as the same parameter.

According to an embodiment, the memory 287 may store the parameter for adjusting a gain (or an amplification degree) of the amplifier 253 as shown in the following Table 1.

TABLE 1

|  | Gain 1 | Gain 2 | . . . | Gain M |
| --- | --- | --- | --- | --- |
| Frequency 1 | $VGA_{1,1}$ | $VGA_{1,2}$ | . . . | $VGA_{1,M}$ |
| Frequency 2 | $VGA_{2,1}$ | $VGA_{2,2}$ | . . . | $VGA_{2,M}$ |
| . . . | . . . | . . . | . . . | . . . |
| Frequency N | $VGA_{N,1}$ | $VGA_{N,2}$ | . . . | $VGA_{N,M}$ |

In Table 1, frequencies 1 to N (where N is an integer) represent the indexes of the frequency band supported by the communication processor 130, and gains 1 to M (where M is an integer) represent the order of parameters obtained. For example, $VGA_{1,1}$ may be a parameter obtained earlier than $VGA_{1,M}$. Entities in Table 1 may be managed in the form of first in first out (FIFO). For example, when a new parameter is obtained in frequency 1, $VGA_{1,1}$ is removed, and $VGA_{1,2}$ becomes new $VGA_{1,1}$. The new parameter may be the new $VGA_{1,M}$. According to an embodiment, the memory 287 may store the parameter for adjusting the phase shift of the phase shifter 255 as shown in following table 2.

TABLE 2

|  | Phase shift 1 | Phase shift 2 | . . . | Phase shift M |
| --- | --- | --- | --- | --- |
| Frequency 1 | $PH_{1,1}$ | $PH_{1,2}$ | . . . | $PH_{1,M}$ |
| Frequency 2 | $PH_{2,1}$ | $PH_{2,2}$ | . . . | $PH_{2,M}$ |
| . . . | . . . | . . . | . . . | . . . |
| Frequency N | $PH_{N,1}$ | $PH_{N,2}$ | . . . | $PH_{N,M}$ |

In Table 2, frequencies 1 to N (where N is an integer) represent the indexes of the frequency bands supported by the communication processor 130, and phase shift 1 to M (where M is an integer) represent the order of parameters obtained. For example, $PH_{1,1}$ may be a parameter obtained earlier than $PH_{1,M}$. Entities of Table 2 may be managed in the form of FIFO. For example, when a new parameter is obtained at frequency 1, $PH_{1,1}$ may be removed, $PH_{1,2}$ may be new $PH_{1,1}$ and the new parameter may be new $PH_{1,M}$. According to an embodiment, the memory 287 may store parameters corresponding to mutually different frequency bands for antennas. For example, the memory 287 may store parameters corresponding to mutually different frequency bands for the first array antenna 171 and parameters corresponding to mutually different frequency bands for the second array antenna 173.

According to an embodiment, the memory 287 may store parameters corresponding to mutually different frequency bands for each antenna depending on whether the antennas are operated. For example, the memory 287 may store parameters corresponding to mutually different frequency bands for the first array antenna 171 depending on whether the different array antennas 173, 175, and 177 are operated.

According to an embodiment, the memory 287 may store parameters corresponding to mutually different frequency bands for each antenna included in the array antenna depending on whether the antennas included in the array antenna operate. For example, the memory 287 may store parameters for the first antenna of a plurality of antennas included in the first array antenna 171 based on an operating state of at least one second antenna of the plurality of antennas except for the first antenna.

The controller 270 may further include an amplifier 289 to transmit the digital signal from the ADC 265 to the outside (e.g., the processor 110 of FIG. 1 and/or the communication processor 130 of FIG. 1).

Figure 3A:
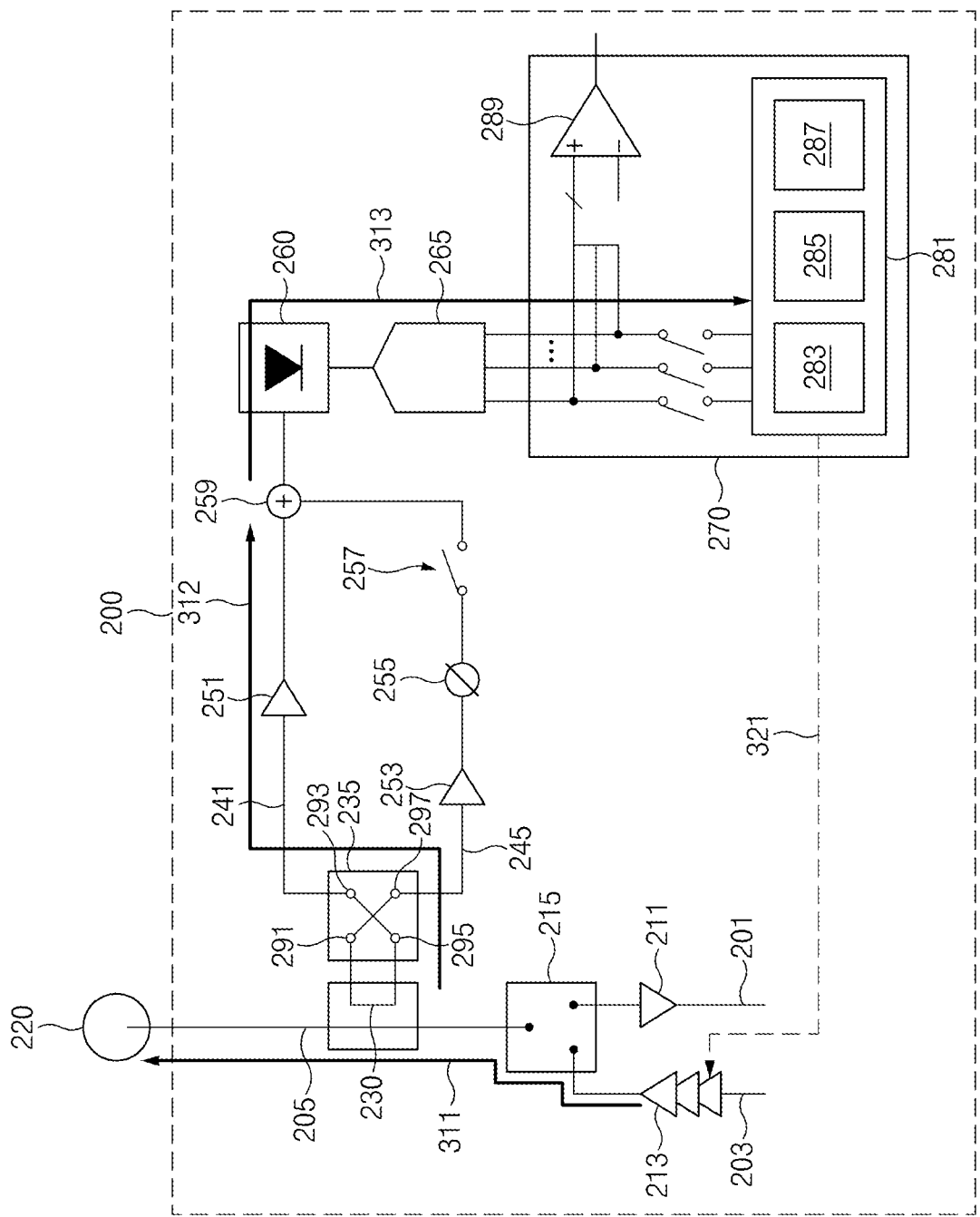
FIG. 3A illustrates a signal flow based on a closed loop power control operation, according to an example embodiment.

FIG. 3A illustrates a signal flow based on a CLPC operation according to an example embodiment.

According to an embodiment, the controller 270 may set a specified gain $A_1$ for the amplifier 251, during the CLPC operation.

According to an embodiment, the controller 270 may control the switch 215 to connect the transmit path 203 to the signal path 205 during the CLPC operation. According to an embodiment, the controller 270 may connect the switch 235 to perform the second switching connection, such that the first signal is input to the differential circuit 259 through the first signal path 241 during the CLPC operation. According to an embodiment, the controller 270 may open the switch 257 such that the first leakage signal and the second signal are not input to the differential circuit 259, during the CLPC operation. In this case, the second switching connection may indicate a state in which the first input terminal 291 of the switch 235 is connected, directly or indirectly, to the second output terminal 297 of the switch 235, and the second input terminal 295 of the switch 235 is connected, directly or indirectly, to the first output terminal 293 of the switch 235. In this case, the first signal may be a coupled signal coupled to a transmit signal on the transmit path 205, the first leakage signal may be a leakage signal of the transmit signal on the transmit path 205, and the second signal may be a coupled signal coupled to the reflection signal of the transmit signal.

As the controller 270 controls the switches 215, 235, and 257, paths 311, 312, and 313 may be generated.

When the transmit signal is transmitted to the antenna 220 through the amplifier 213 and the switch 215, the coupler 230 may obtain the first signal.

As the switch 235 goes through the second switching connection, the first signal may be input to the differential circuit 259 along the path 312. Meanwhile, it may be understood that the first leakage signal and the second signal are not input to the differential circuit 259, as the switch 257 is open.

Accordingly, only the first signal may be input to the differential circuit 259. The first signal may be expressed as following Equation 1.

First signal=$A_1 \times CPL \times V$　　　　　Equation 1

In Equation 1, $A_1$ is a gain set in the amplifier 251 during the CLPC operation, CPL is a coupling ratio of the coupler, and V represents a transmit signal on the signal path 205.

The differential circuit 259 may generate a differential signal. The generated differential signal may be transmitted to the controller 270 along the path 313.

While the differential signal is transmitted along the path 313, the power detector 260 may detect the strength $P_{Diff}$ of the differential signal and transmit the detected strength to the ADC 265.

While the differential signal is transmitted along the path 313, the ADC 265 may convert the detected strength into a digital signal and transmit the digital signal to the controller 270.

According to an embodiment, the CLPC circuit 283 of the controller 270 may control the gain of the amplifier 213 based on the digital signal input through the ADC 265. For example, the CLPC circuit 283 of the controller 270 may control the gain of the amplifier 213 through a control path 321. The CLPC circuit 283 may control the gain of the amplifier 213, such that the transmit signal has a target strength.

Figure 3B:
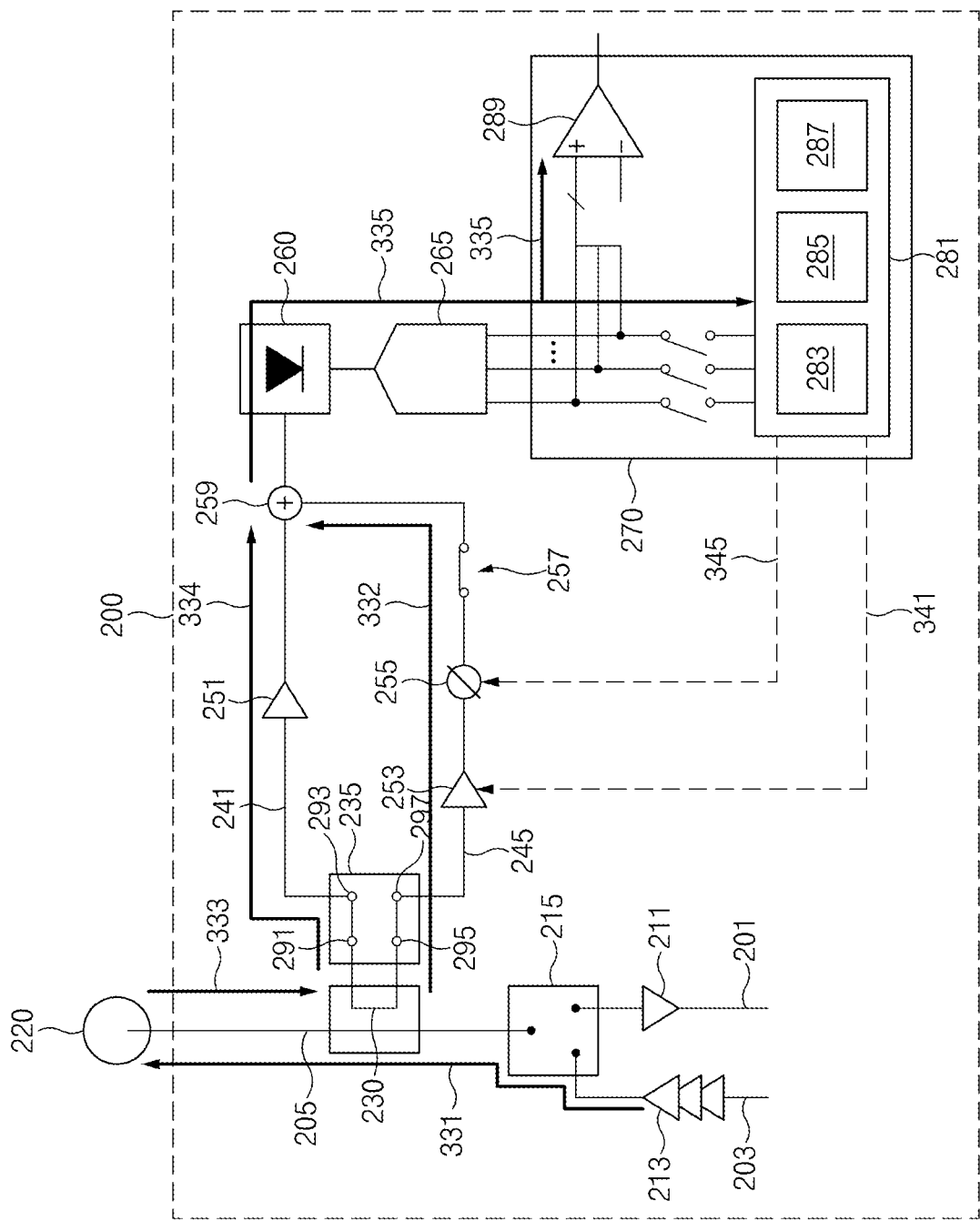
FIG. 3B illustrates a signal flow based on an operation of detecting an event, according to an example embodiment.

FIG. 3B illustrates a signal flow based on an operation of detecting an event, according to an example embodiment.

According to an embodiment, the controller 270 may set a specific gain $A_2$ for the amplifier 251 during the operation of detecting the event and apply parameters corresponding to the frequency of the transmit signal to the amplifier 253 and/or the phase shifter 255.

According to an embodiment, the parameter control circuit 285 may identify parameters corresponding to the frequency of the transmit signal, based on parameter tables (e.g., Table 1 and Table 2) stored in the memory 287 and apply the identified parameters to the amplifier 253 and/or the phase shifter 255. According to an embodiment, the parameters corresponding to the frequency of the transmit signal may be selected from values input to tables (e.g., Table 1 and Table 2). For example, for frequency 1 of the transmit signal, the parameters applied to the amplifiers 253 may be $VGA_{1,M}$, and the parameters applied to the phase shifter 255 may be $PH_{1,M}$. According to an embodiment, the parameters corresponding to the frequency of the transmit signal may be the average of values input to tables (e.g., Table 1 and Table 2). For example, for frequency 1 of the transmit signal, the parameter applied to the amplifiers 253 may be the average of $VGA_{1,1}$ to $VGA_{1,M}$, and the parameter applied to the phase shifter 255 may be the average of $PH_{1,1}$ to $PH_{1,M}$.

The gain "α" set for the amplifier 253 and/or the phase shift "φ" set for the phase shifter 255 during the operation of detecting the event may be parameters that make the normalization strength of the differential signal, which is output from differential circuit 259, zero in a free space.

The parameter control circuit 285 may set the gain "α" for the amplifier 253 through a control path 341, and may set the phase shift "φ" for the phase shifter 255 through a control path 345. In this case "α" may be a value obtained by dividing the normalization strength of the differential signal by the coupling ratio as shown in following Equation 2.

$$\alpha = \frac{A_2 \times (CPL \times \Gamma_{ref} + ISO)}{CPL} \quad \text{Equation 2}$$

In Equation 2, $A_2$ is the gain set for amplifier 251 during the operation of detecting the event, CPL is the coupling ratio of coupler 230, $\Gamma_{ref}$ is the reflection coefficient of the antenna 220 in a free space (or quasi free space), and ISO is the coupler isolation.

According to an embodiment, the controller 270 may control the switch 215 to connect the transmit path 203 to the signal path 205 during the operation of detecting the event. According to an embodiment, the controller 270 may perform the first switching connection for the switch 235 and close the switch 257, such that the first signal is input into the differential circuit 259 through the second signal path 245. According to an embodiment, the controller 270 may input the first leakage signal and the second signal into the differential circuit 259 through the first signal path 241. In this case, the first switching connection may indicate a state in which the first input terminal 291 of the switch 235 is connected, directly or indirectly, to the first output terminal 293 of the switch 235, and the second input terminal 295 of the switch 235 is connected, directly or indirectly, to the second output terminal 297 of the switch 235.

As the controller 270 controls the switches 215, 235, and 257, paths 331, 332, 333, 334, and 335 may be generated.

When a transmit signal is transmitted to the antenna 220 through the amplifier 213 and the switch 215 along the path 331, the coupler 230 may obtain the first signal and the first leakage signal.

As the switch 235 goes through the first switching connection and the switch 257 is closed, the first signal may be input to the differential circuit 259 along the path 332.

When the transmit signal is reflected by the antenna 220, the coupler 230 may obtain the second signal along the path 333. The second signal and the first leakage signal may be input to the differential circuit 259 along the path 334.

In this case, the first signal input to the differential circuit 259 may be expressed as in following Equation 3, and the second signal and the first leakage signal may be expressed as in the following Equation 4.

$$\text{First signal} = CPL \times a \cdot e^{j \cdot \varphi} \times V \qquad \text{Equation 3}$$

In Equation 3, CPL is the coupling ratio of the coupler 230, V is the transmit signal on the signal path 205, a is the gain set for the amplifier 253 during the operation of detecting the event, and φ represents the phase shift of the phase shifter 255 during the operation of detecting the event.

$$\text{Second signal and first leakage signal} = A_2 \times (CPL \times \Gamma + ISO) \times V \qquad \text{Equation 4}$$

In Equation 4, $A_2$ is the gain set for the amplifier 251 during the operation of detecting the event, CPL is the coupling ratio of coupler 230, V is a transmit signal on the signal path 205, and Γ represents a reflection coefficient of the antenna 220, and "ISO" represents the coupler isolation. In Equation 3, the signal expressed as in "CPL*Γ" is the second signal, and the signal expressed by "ISO" is the first leakage signal of the transmit signal.

The differential circuit 259 may generate a differential signal. The generated differential signal may be transmitted to the controller 270 along the path 335. The differential signal may be expressed as in following Equation 5.

$$\text{Differential signal} = A_2 \times CPL \times (\Gamma - \Gamma_{ref}) \times V \qquad \text{Equation 5}$$

It may be recognized from Equation 5, that the differential signal is based on the difference between the reflection coefficients without the influence of the leakage signal resulting from the coupler isolation.

While the differential signal is transmitted along the path 335, the power detector 260 may detect the normalized strength of the differential signal by dividing the strength $P_{Diff}$ of the differential normalized signal by the strength $P_{TX}$ of the transmit signal, and transmit the detected strength to the ADC 265.

While the differential signal is transmitted along the path 335, the ADC 265 may convert the detected normalized strength into a digital signal and transmit the digital signal to the controller 270.

According to an embodiment, the controller 270 may transmit the normalized strength of the differential signal, which is obtained during the operation of detecting the event, to the outside (e.g., the processor 110 of FIG. 1 and/or the communication processor 130 of FIG. 1) through the amplifier 289. According to an embodiment, the processor 110 of FIG. 1 and/or the communication processor 130 of FIG. 1 may determine whether the control over the transmission of the radio signal is necessary, by comparing the normalized strength of the differential signal with the reference strength $TH_{max}$. For example, when the normalized strength of the differential signal exceeds the reference strength $TH_{max}$, the communication processor 130 may determine the control over the transmission of the radio signal as being necessary. According to an embodiment, when the control over the transmission of the radio signal is necessary, the communication processor 130 may reduce the strength $P_{TX}$ of the transmit signal. For example, the controller 270 may reduce the strength $P_{TX}$ of the transmit signal by reducing the gain of the amplifier 213, in response to the instruction of the communication processor 130. According to another embodiment, when the control over the transmission of the radio signal is necessary, the communication processor 130 may change an antenna to output the transmit signal. For example, the controller 270 may output the transmit signal to another antenna (one of a plurality of array antennas except for the antenna 220), in response to the instruction of the communication processor 130. For example, the controller 270 may output the transmit signal through the second antenna module 173, when the antenna to output the transmit signal is changed to the second antenna module 173 while the radio signal is transmitted through the first antenna module 171.

According to an embodiment, the parameter control circuit 285 may determine whether to perform an operation of adjusting the parameter, based on the normalized strength of the differential signal obtained during the operation of detecting the event. For example, the parameter control circuit 285 may identify the operation of adjusting the parameter as being necessary, when the normalized strength of the differential signal is equal to or less than a reference strength $TH_{floor}$. According to an embodiment, the reference strength $TH_{floor}$ may be lower than the reference strength $TH_{max}$.

Figure 3C:
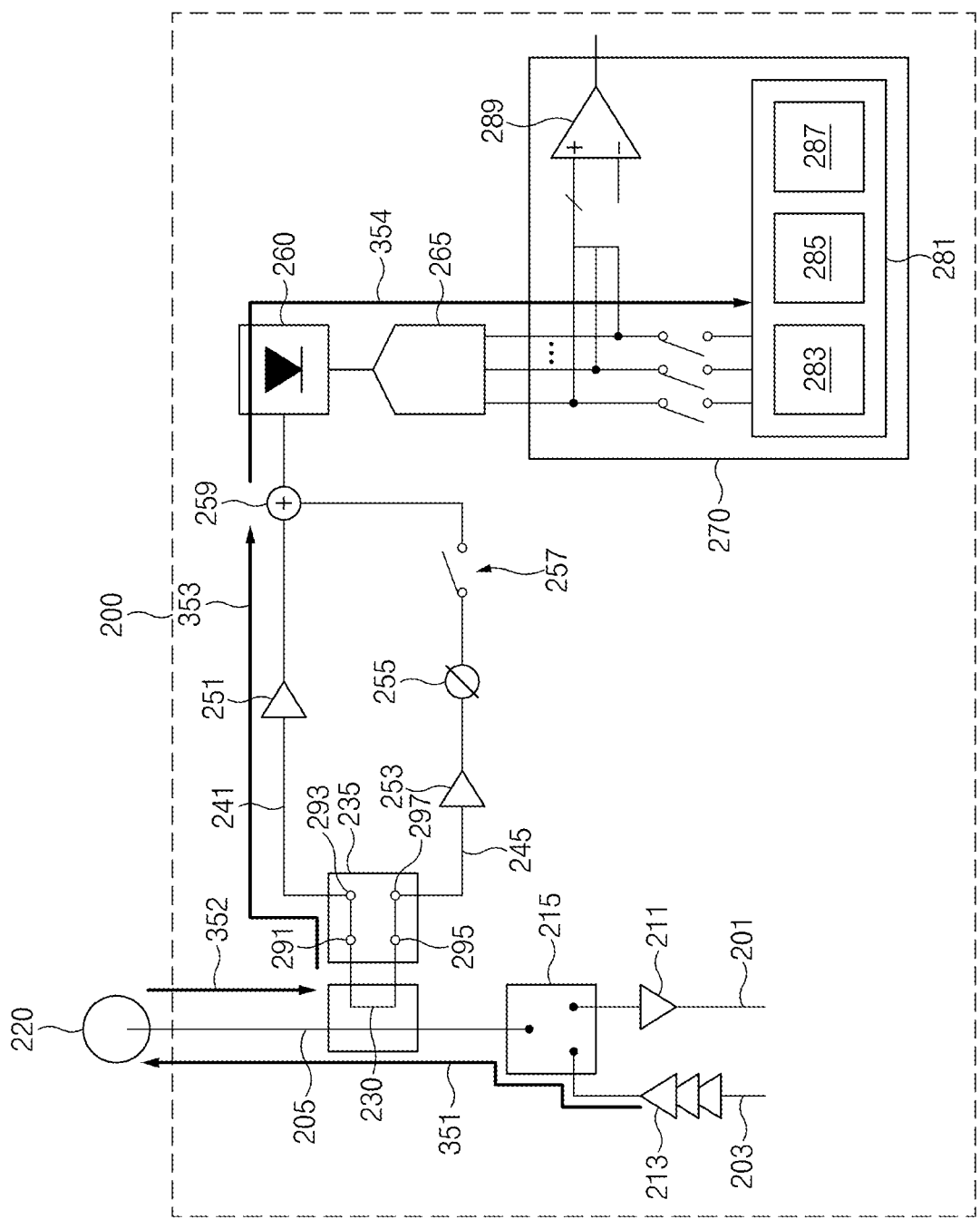
FIG. 3C illustrates a signal flow based on an operation of adjusting a first parameter, according to an example embodiment.

FIG. 3C illustrates a signal flow based on an operation of adjusting a first parameter, according to an example embodiment.

According to an embodiment, the controller 270 may set a specified gain $A_2$ for the amplifier 251, during the operation of adjusting the first parameter.

According to an embodiment, the controller 270 may control the switch 215 to connect the transmit path 203 to the signal path 205 during the operation of adjusting the first parameter. According to an embodiment, the controller 270 may perform the first switching connection for the switch 235 such that the first leakage signal and the second signal are input into the differential circuit 259 while the first parameter is adjusted. According to an embodiment, the controller 270 may open the switch 257 such that the first signal is not input to the differential circuit 259 through the second signal path 245, during the operation of adjusting the first parameter.

As the controller 270 controls the switches 215, 235, and 257, paths 351, 352, 353, and 354 may be generated.

When the transmit signal is transmitted to the antenna 220 through the amplifier 213 and the switch 215 along the path 351, the coupler 230 may obtain the first signal and the first leakage signal. Meanwhile, it may be understood that the first signal is not input to the differential circuit 259, as the switch 257 is open.

When the transmit signal is reflected by the antenna 220, the coupler 230 may obtain the second signal along the path 352. The second signal and the first leakage signal may be input to the differential circuit 259 along the path 353.

The differential circuit 259 may generate a differential signal. The generated differential signal may be transmitted to the controller 270 along the path 354. The differential signal may be expressed as in following Equation 4.

While the differential signal is transmitted along the path 354, the power detector 260 may detect the normalized strength of the differential signal by dividing the strength $P_{Diff}$ of the differential signal by the strength $P_{TX}$ of the transmit signal, and transmit the detected normalized strength to the ADC 265.

While the differential signal is transmitted along the path 354, the ADC 265 may convert the detected normalized strength into a digital signal and transmit the digital signal to the controller 270.

According to an embodiment, the parameter control circuit 285 of the controller 270 may identify the gain "α" corresponding to the frequency of the transmit signal, based on the digital signal. For example, the gain "α" may be a value obtained by dividing the normalized strength of the differential signal by the coupling ratio.

Figure 3D:
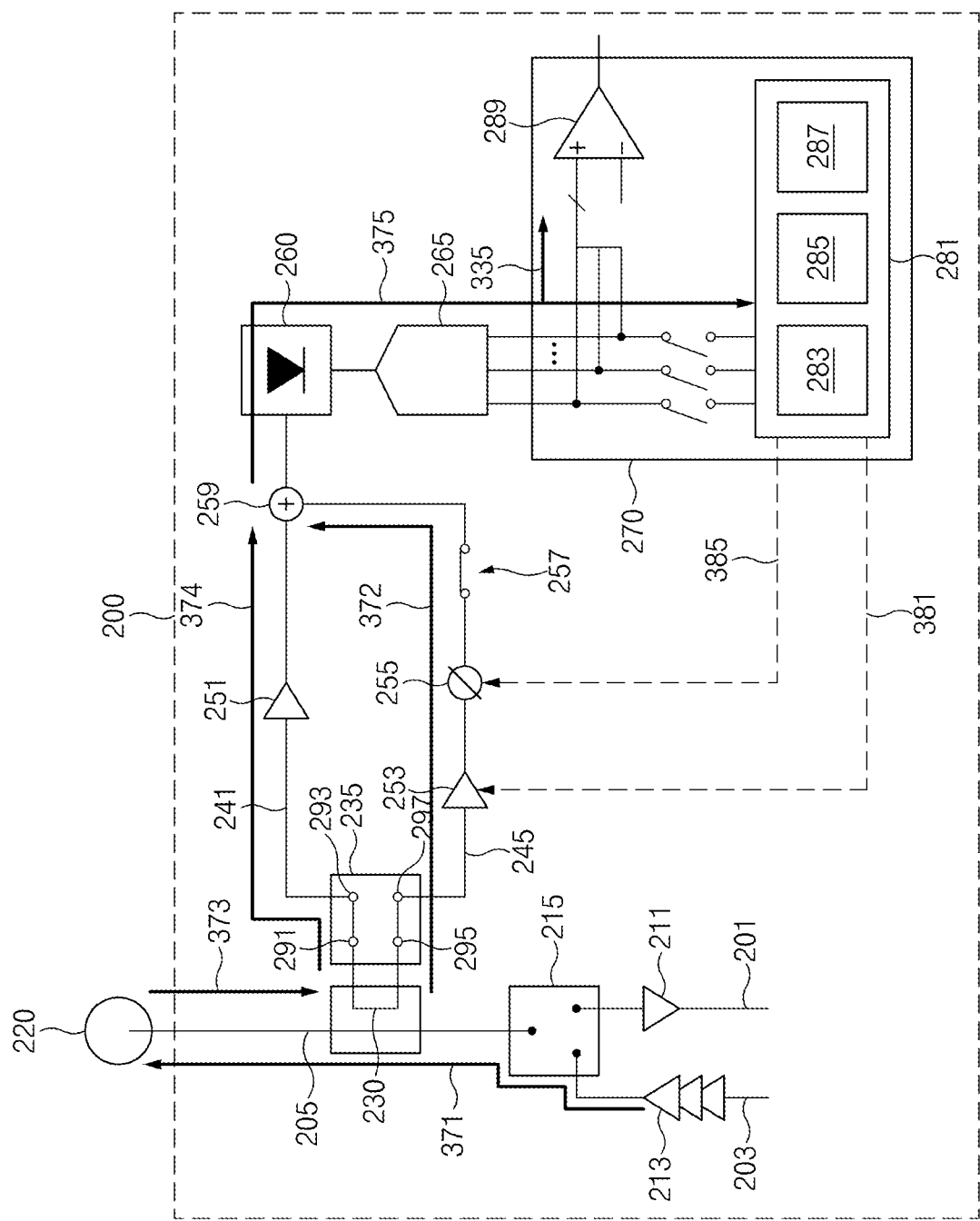
FIG. 3D illustrates a signal flow based on an operation of adjusting a second parameter, according to an example embodiment.

FIG. 3D illustrates a signal flow based on an operation of adjusting a second parameter, according to an example embodiment.

According to an embodiment, the controller 270 may set a specific gain $A_2$ for the amplifier 251, during the operation of adjusting the second parameter.

According to an embodiment, the parameter control circuit 285 may set the identified gain "α" for the amplifier 253, during the operation of adjusting the first parameter. According to an embodiment, the parameter control circuit 285 may set the gain "α" for the amplifier 253, through the control path 381.

According to an embodiment, the parameter control circuit 285 may sequentially change the phase shift "φ" of the phase shifter 255 during the operation of adjusting the second parameter. According to an embodiment, the parameter control circuit 285 may increase or decrease the phase shift "φ" of the phase shifter 255 at a specific time interval. According to an embodiment, the parameter control circuit 285 may set the phase shift "φ" of the phase shifter 255 for the amplifier 253, through the control path 385.

According to an embodiment, the controller 270 may control the switch 215 to connect the transmit path 203 to the signal path 205 during the operation of adjusting the second parameter. According to an embodiment, the controller 270 may perform the first switching connection for the switch 235 and close the switch 257, such that the first signal is input into the differential circuit 259 through the second signal path 245, during the operation of adjusting the second parameter. According to an embodiment, the first leakage signal and the second signal may be input into the differential circuit 259 through the first signal path 241, during the operation of adjusting the second parameter, as the switch 235 goes through the first switching connection.

As the controller 270 controls the switches 215, 235, and 257, paths 371, 372, 373, 374, and 375 may be generated.

When the transmit signal is transmitted to the antenna 220 through the amplifier 213 and the switch 215 along the path 371, the coupler 230 may obtain the first signal and the first leakage signal.

As the switch 235 goes through the first switching connection and the switch 257 is closed, the first signal may be input to the differential circuit 259 along the path 372.

When the transmit signal is reflected by the antenna 220, the coupler 230 may obtain the second signal along the path 373. The second signal and the first leakage signal may be input to the differential circuit 259 along the path 374.

The differential circuit 259 may generate a differential signal. The generated differential signal may be transmitted to the controller 270 along the path 375.

While the differential signal is transmitted along the path 375, the power detector 260 may detect the normalized strength of the differential signal, by dividing the strength $P_{Diff}$ of the differential signal by the strength $P_{TX}$ of the transmit signal, and transmit the detected normalized strength to the ADC 265.

While the differential signal is transmitted along the path 375, the ADC 265 may convert the detected normalized strength into a digital signal and transmit the digital signal to the controller 270.

According to an embodiment, the parameter control circuit 285 of the controller 270 may determine whether the normalized strength of the differential signal is equal to or less than a reference strength $TH_{zero}$. According to an embodiment, the reference strength $TH_{zero}$ may be lower than the reference strength $TH_{floor}$.

According to an embodiment, when the normalized strength of the differential signal is less than or equal to the reference strength $TH_{zero}$, the parameter control circuit 285 may store the identified gain "α" and the phase shift "φ" into the memory 287. The parameter control circuit 285 may store the specified identified gain "α" and the specified phase shift "φ" to the memory 287, depending on the FIFO scheme. The parameter control circuit 285 may store the gain "α" and the phase shift "φ" with respect to entities, which correspond to the frequency of the transmit signal, in parameter tables (e.g., table 1 and table 2) stored in the memory 287.

According to an embodiment, when the normalized strength of the differential signal exceeds the reference strength $TH_{zero}$, the parameter control circuit 285 may change the phase shift "φ" of the phase shifter 255 to a next phase shift.

According to another embodiment, when the normalized strength of the differential signal obtained in all phases of the identified gain "α" exceeds the reference strength $TH_{zero}$, the parameter control circuit 285 may adjust the gain "α". Thereafter, the controller 270 may perform the operation of adjusting the second parameter again, based on the adjusted gain "α".

Figure 4:
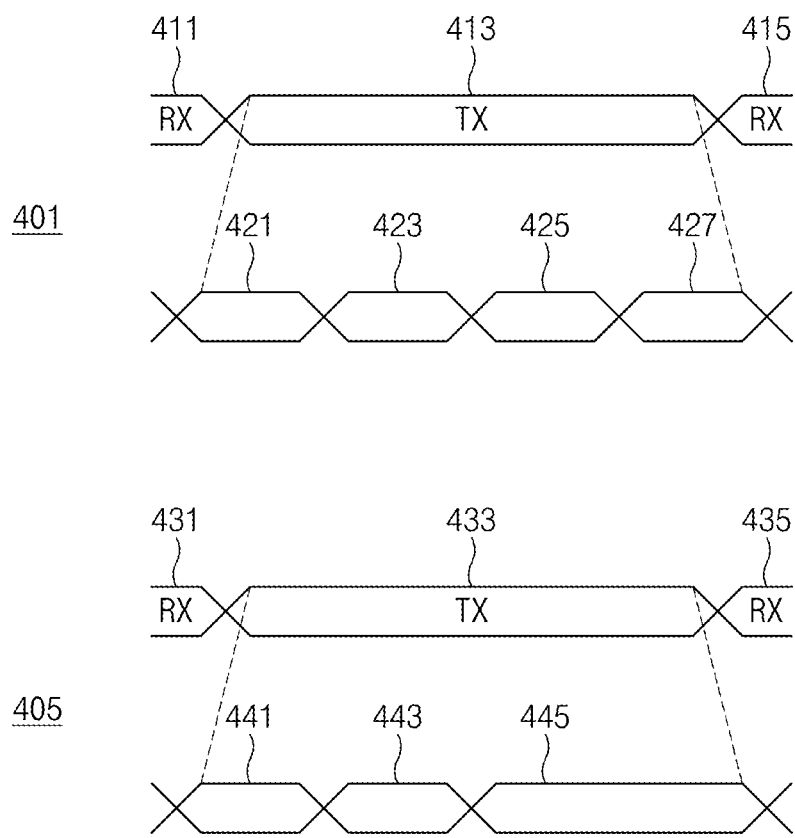
FIG. 4 illustrates a transmit sequence, according to an example embodiment.

FIG. 4 illustrates a signal sequence, according to an example embodiment.

Referring to FIG. 4, in the sequences 401 and 405, receive operations 411, 415, 431, and 435 and transmit operations TX 413 and 433 may be alternately performed.

Four sub-durations 421, 423, 425, and 427 may be involved in the signal sequence 401. The sub-duration 421 may be a duration in which the CLPC operation is performed. The sub-duration 423 may be a duration in which the operation of detecting an event is performed. The sub-duration 425 may be a duration in which the operation of adjusting the first parameter is performed. The sub-duration 427 may be a duration in which the operation of adjusting the second parameter is performed.

Meanwhile, three sub-durations 441, 443, and 445 may be involved in the signal sequence 405. The sub-duration 441 may be a duration in which the CLPC operation is performed. The sub-duration 443 may be a duration in which the operation of detecting the event is performed. The sub-duration 445 may be the duration in which the CLPC operation, the operation of detecting the event, the operation of adjusting the first parameter, and the operation of adjusting the second parameter are not performed.

The signal sequence 401 shows that the sub-durations 425 and 427 for the operation of adjusting the first parameter and the operation of adjusting the second parameter are further present, as the normalized strength of the differential signal is equal to or less than the reference strength $TH_{floor}$ based on the operation of detecting the event. For example, when the normalized strength of the differential signal obtained based on the operation of detecting the event is equal to or less than the reference strength $TH_{floor}$, the signal sequence 401 shows that the controller 270 allocates remaining time durations of the time duration allocated for the transmit operation 413 as sub-durations 425 and 427 for adjusting the first parameter and the second parameter.

The signal sequence 405 shows that the sub-durations for the operation of adjusting the first parameter and the operation of adjusting the second parameter are not further present, as the normalized strength of the differential signal exceeds the reference strength $TH_{floor}$ based on the operation of detecting the event. For example, when the normalized strength of the differential signal obtained based on the operation of detecting the event is exceeds the reference strength $TH_{floor}$, the signal sequence 405 shows that the controller 270 does not allocate remaining time durations of the time duration allocated for the transmit operation 433 as sub-durations 425 and 427 for adjusting the first parameter and the second parameter.

Figure 5A:
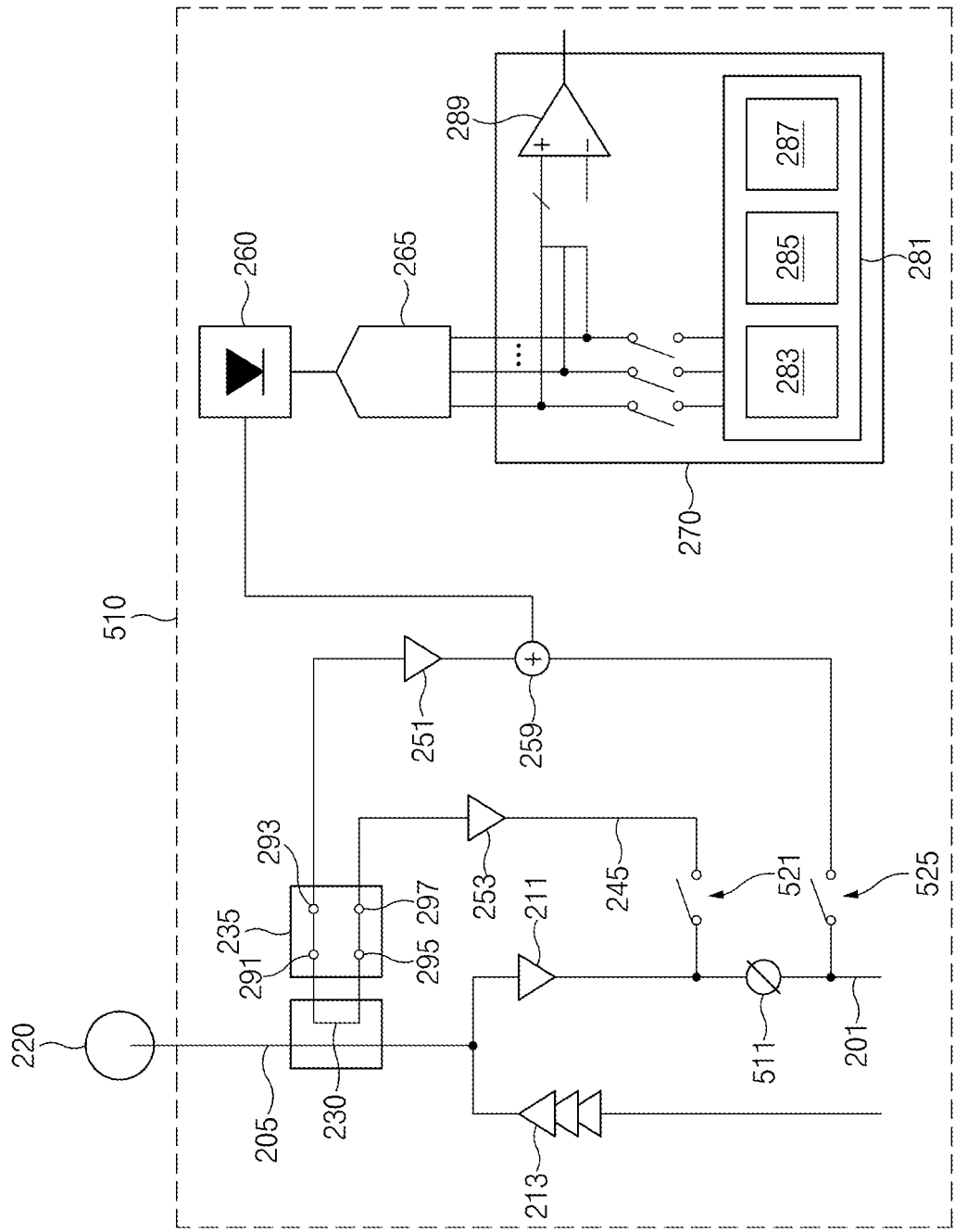
FIG. 5A illustrates another structure of an RFFE of an electronic device, according to an example embodiment.

FIG. 5A illustrates another structure of an RFFE 510 of an electronic device, according to an example embodiment.

The RFFE 510 of FIG. 5A may have a structure in which a phase shifter 511 is shared between the receive path 201 and the second signal path 245, as compared to the RFFE 200 of FIG. 2.

The controller 270 may control the open/close state of switches 521 and 525 such that the phase shifter 511 is used on mutually different signal paths 201 and 245 during the transmit operation or the receive operation.

According to an embodiment, the controller 270 may open the switches 521 and 525, while the radio signal from the antenna 220 is received. According to an embodiment, the controller 270 may open or close the switches 521 and 525, while the radio signal from the antenna 220 is transmitted. For example, the controller 270 may open the switches 521 and 525 during the CLPC operation and the operation of adjusting the first parameter. For another example, the controller 270 may close the switches 521 and 525 during the operation of detecting the event and the operation of adjusting the second parameter.

Figure 5B:
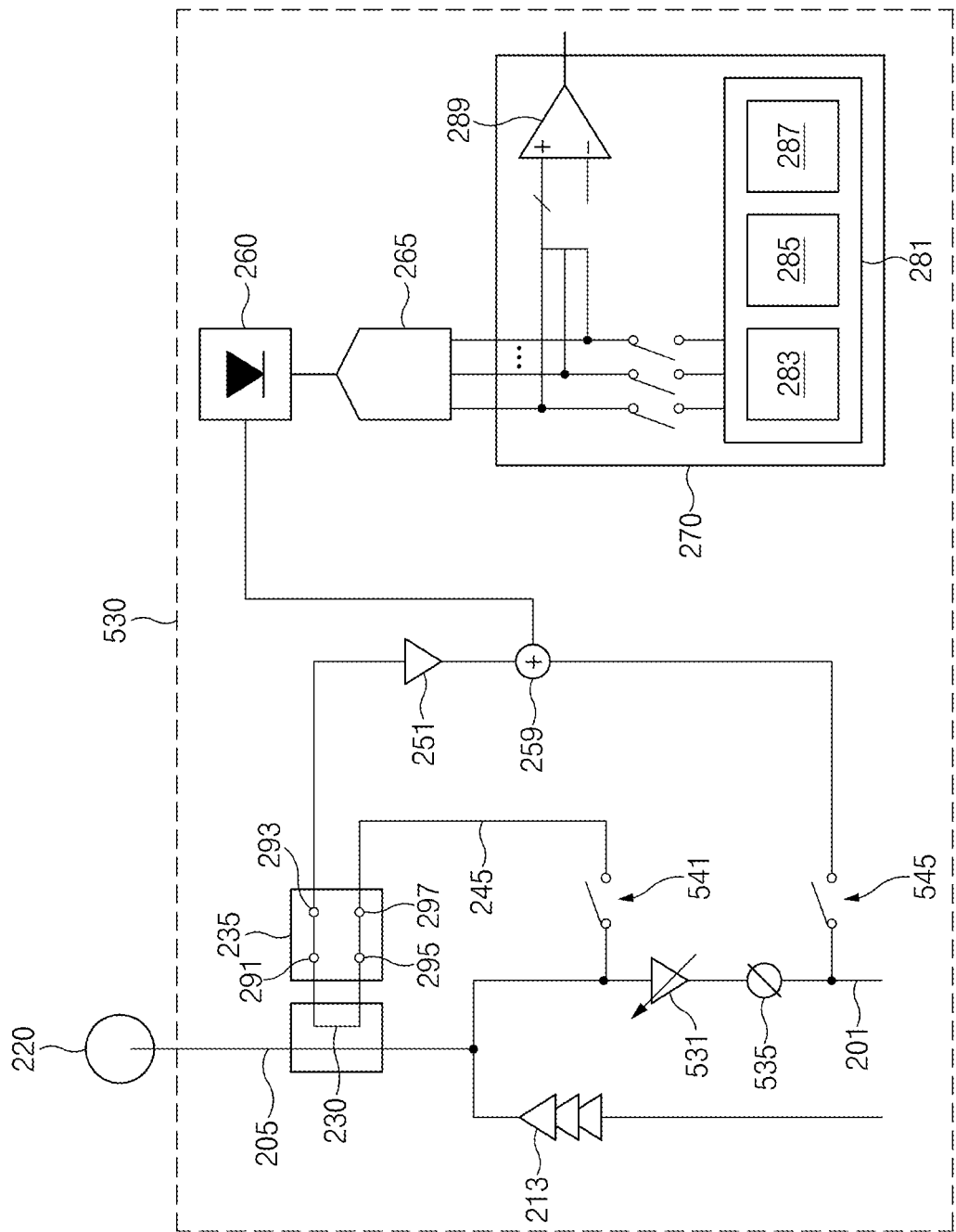
FIG. 5B illustrates another structure of an RFFE of an electronic device, according to an example embodiment.

FIG. 5B illustrates another structure of an RFFE 530 of an electronic device, according to an example embodiment.

The RFFE 530 of FIG. 5B may have a structure in which an amplifier 531 and a phase shifter 535 are shared between the receive path 201 and the second signal path 245, as compared to the RFFE 200 of FIG. 2.

The controller 270 may control the open/closed state of switches 541 and 545 such that the amplifier 531 and the phase shifter 535 are used on mutually different signal paths 201 and 245 during the transmit operation or the receive operation.

According to an embodiment, the controller 270 may open the switches 541 and 545, while the radio signal from the antenna 220 is received. According to an embodiment, the controller 270 may open or close the switches 541 and 545, while the radio signal is transmitted from the antenna 220. For another example, the controller 270 may open the switches 541 and 545 during the CLPC operation and the operation of adjusting the first parameter. For another example, the controller 270 may close the switches 541 and 545 during the operation of detecting the event and the operation of adjusting the second parameter.

Figure 5C:
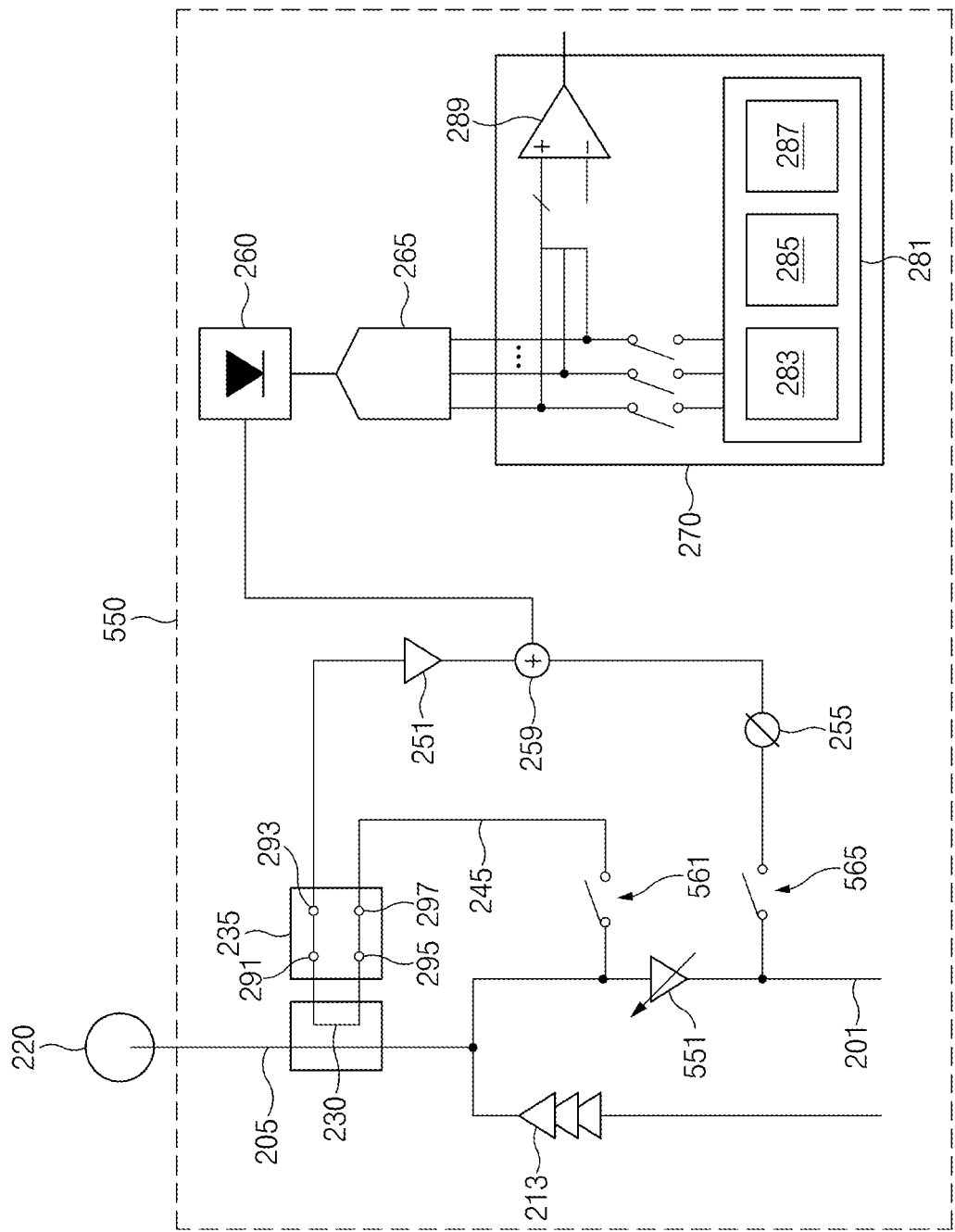
FIG. 5C illustrates another structure of an RFFE of an electronic device, according to an example embodiment.

FIG. 5C illustrates another structure of an RFFE 550 of an electronic device, according to an example embodiment.

The RFFE 550 of FIG. 5C may have a structure in which an amplifier 551 is shared between the receive path 201 and the second signal path 245, as compared to the RFFE 200 of FIG. 2.

The controller 270 may control the open/closed state of switches 561 and 565 such that the amplifier 551 is used on mutually different signal paths 201 and 245 during the transmit operation or the receive operation.

According to an embodiment, the controller 270 may open the switches 561 and 565, while the radio signal from the antenna 220 is received. According to an embodiment, the controller 270 may open or close the switches 561 and 565, while the radio signal from the antenna 220 is transmitted. For another example, the controller 270 may open the switches 561 and 565 during the CLPC operation and the operation of adjusting the first parameter. For another example, the controller 270 may close the switches 561 and 565 during the operation of detecting the event and the operation of adjusting the second parameter.

Figure 6:
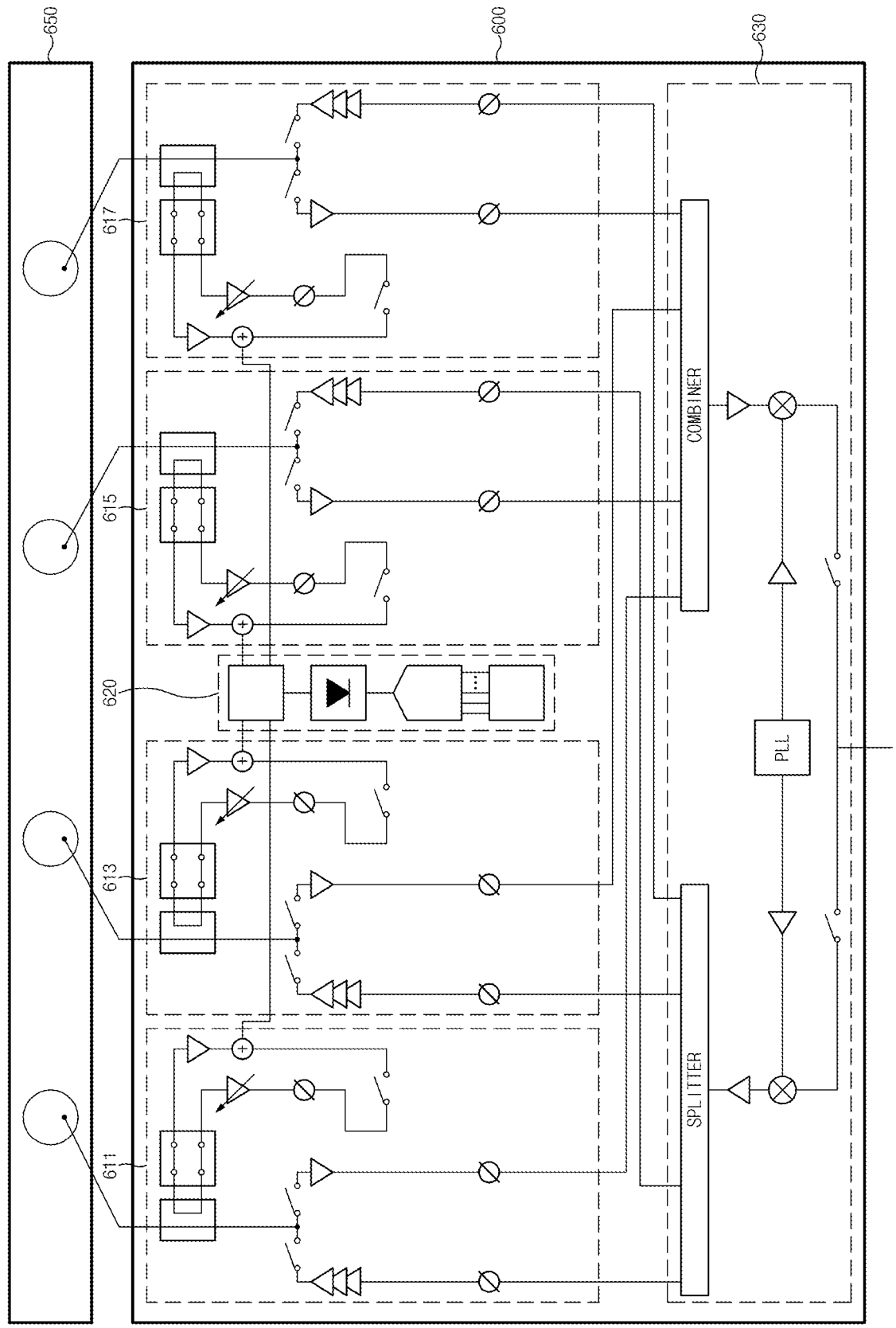
FIG. 6 illustrates an RFFE and an array antenna of an electronic device, according to an example embodiment.

FIG. 6 illustrates an RFFE 600 and an array antenna 650 of an electronic device according to an example embodiment.

Referring to FIG. 6, the RFFE 600 may include four circuit modules 611, 613, 615, and 617, a control module 620, and a distributing and combining module 630.

Each of the four circuit modules 611, 613, 615, and 617 may include a plurality of amplifiers, a plurality of switches, a coupler, a phase shifter, and a differential circuit. The connection relationship between circuit components of each of the circuit modules 611, 613, 615, and 617 of FIG. 6 may be the same as the connection relationship between the circuit components of the RFFE 200 of FIG. 2.

The control module 620 may further include a switch to connect four circuit modules to each other, a power detector (e.g., the power detector 260 in FIG. 2) connected, directly or indirectly, to the switch, an ADC (e.g., the ADC 265 in FIG. 2), and a controller (e.g., the controller 270 in FIG. 2).

The distributing and combining module 630 may include circuit components to transmit signals from an RFIC (e.g., the RFIC 150 of FIG. 1) to four circuit modules 611, 613, 615, and 617, and to transmit the receive signals transmitted from the four circuit modules 611, 613, 615, and 617 to the RFIC 150. The distributing and combining module 630 may include at least one amplifier, at least one switch, a phase locked loop, a splitter, a combiner, or the combination thereof.

The array antenna 650 may include four antennas. The four circuit modules 611, 613, 615, and 617 may be connected, directly or indirectly, to four antennas of the array antenna 650, respectively. Each "module" herein may comprise circuitry.

The control module 620 may control each of the fourth circuit modules 611, 613, 615, and 617 to perform the CLPC operation, the operation of detecting the event, and the operation of adjusting the parameter.

Figure 7A:
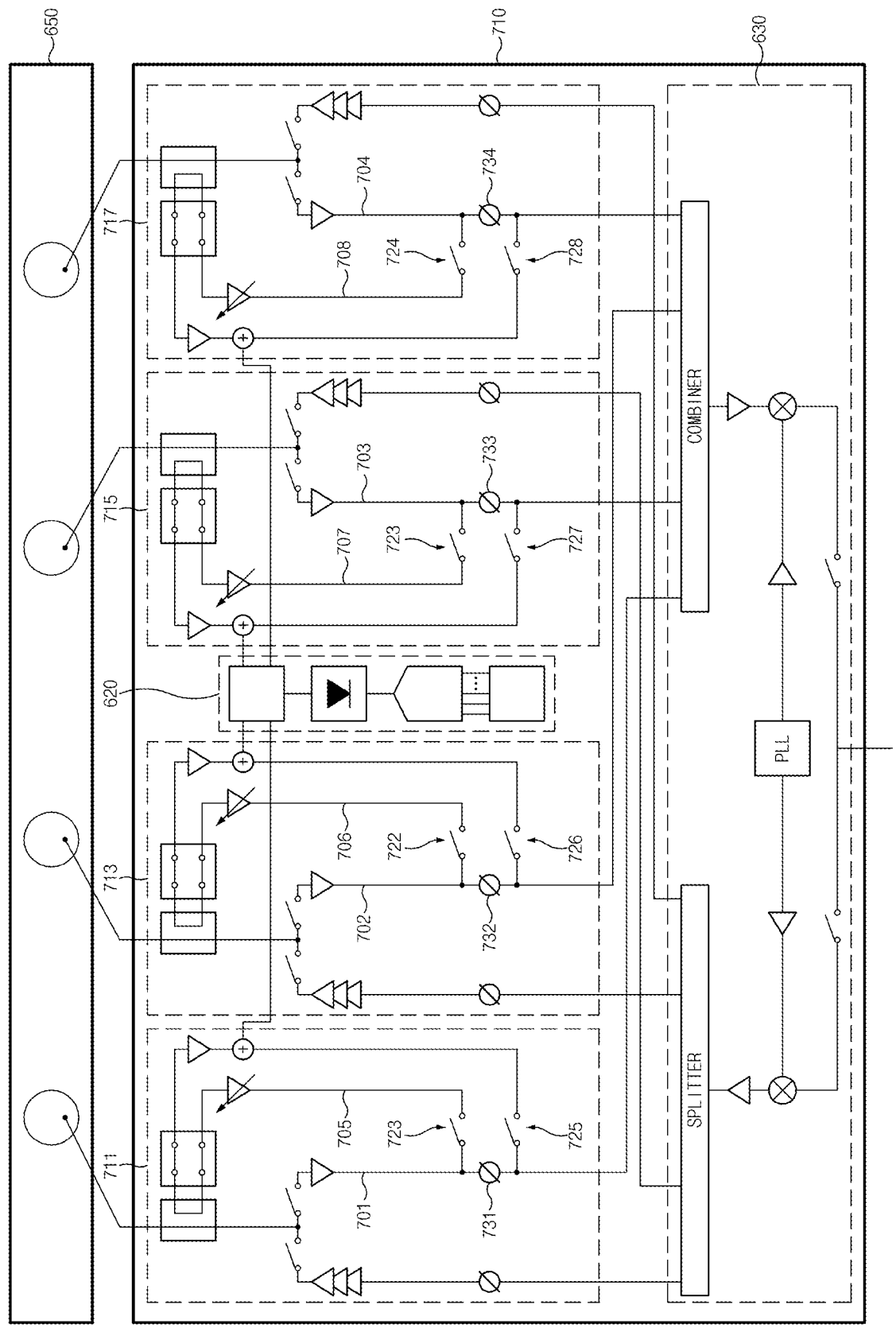
FIG. 7A illustrates an RFFE of an electronic device, and an array antenna, according to an example embodiment.

FIG. 7A illustrates an RFFE 710 and the array antenna 650 of an electronic device, according to an example embodiment.

The RFFE 710 of FIG. 7A may have a structure in which relevant phase shifters 731, 732, 733, 734 of four circuit modules 711, 713, 715 and 717 are shared between relevant receive paths 701, 702, 703, 704, and relevant second signal paths 705, 706, 707, and 708.

The control module 620 may control the open/closed states of the switches 721, 722, 723, 724, 725, 726, 727, and 728, such that the phase shifters 731, 732, 733, 734 are used in mutually different signal paths 701, 702, 703, 704, 705, 706, 707, and 708 during the transmit operation or the receive operations. For example, the control module 620 may control the open/closed state of the switches 721 and 725, such that the phase shifter 731 is used in the mutually different signal paths 701 and 705 during the transmit operation or the receive operation.

According to an embodiment, the control module 620 may open the switches 721, 722, 723, 724, 725, 726, 727, and 728 while receiving a radio signal from the array antenna 650.

According to an embodiment, the control module 620 may open or close the switches 721, 722, 723, 724, 725, 726, 727, and 728 while a radio signal is transmitted from the array antenna 650. For example, the control module 620 may open the switches 721, 722, 723, 724, 725, 726, 727, and 728 during the CLPC operation and the operation of adjusting the first parameter. For another example, the control module 620 may close the switches 721, 722, 723, 724, 725, 726, 727, and 728 during the operation of detecting the event and the operation of adjusting the second parameter.

Figure 7B:
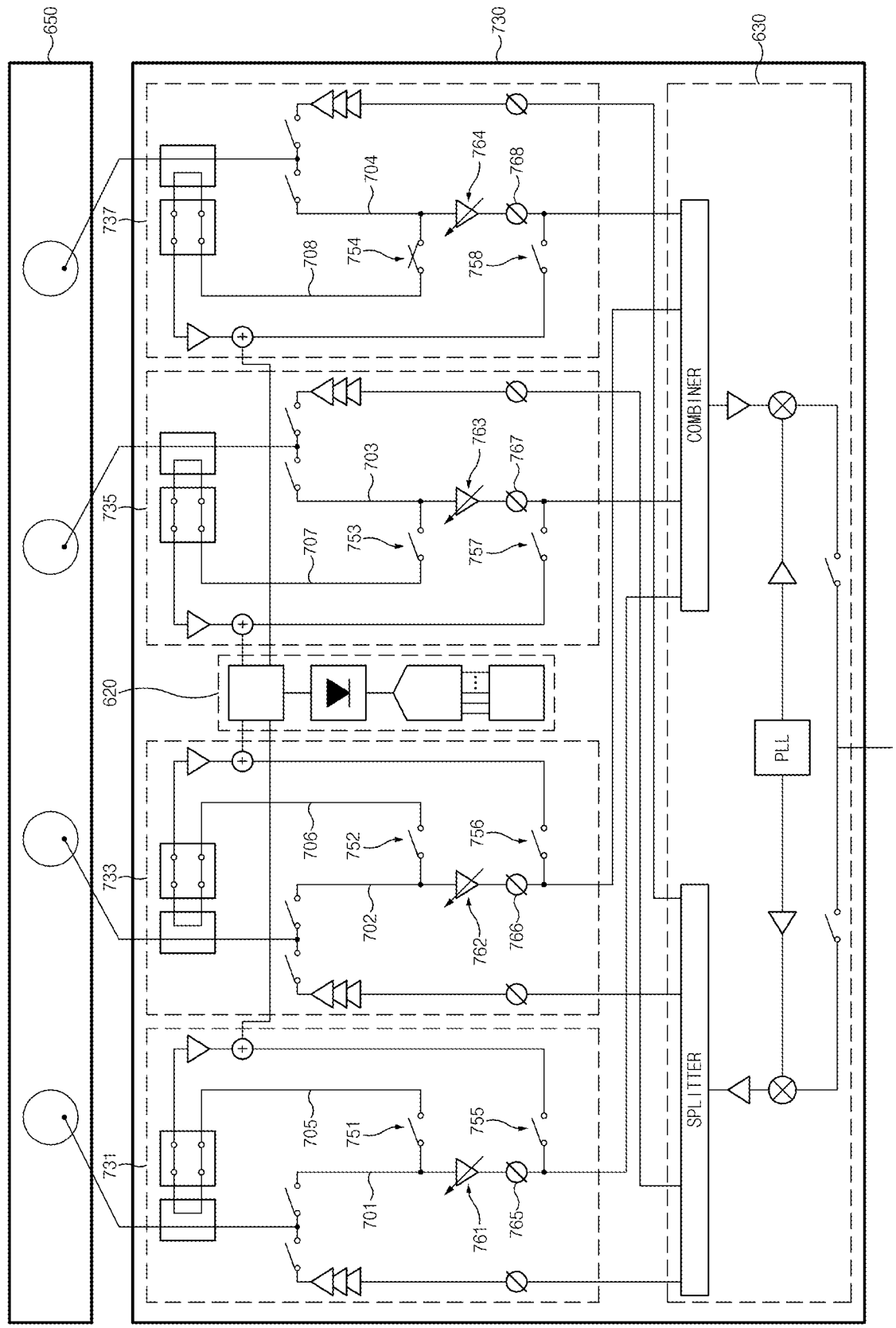
FIG. 7B illustrates an RFFE of an electronic device, and an array antenna, according to an example embodiment.

FIG. 7B illustrates an RFFE 730 and the array antenna 650 of an electronic device according to an example embodiment.

The RFFE 730 of FIG. 7B may have a structure in which relevant amplifiers 761, 762, 763, and 764 and relevant phase shifters 765, 766, 767, 768 of four circuit modules 741, 743, 745, and 747 are shared between relevant receive paths 701, 702, 703, 704, and relevant second signal paths 705, 706, 707, and 708, as compared to the RFFE 600 of FIG. 6.

The control module 620 may control the open/closed state of the switches 751, 752, 753, 754, 755, 756, 757, and 758, such that the amplifiers 761, 762, 763, and 764 and the phase shifters 765, 766, 767, and 768 are used on mutually different signal paths 701, 702, 703, 704, 705, 706, 707, and 708 during the transmit operation or the receive operation. For example, the control module 620 may control the open/closed state of the switches 751 and 765, such that the amplifier 761 and the phase shifter 765 are used on mutually different signal paths 701 and 705 during the transmit operation or the receive operation.

According to an embodiment, the control module 620 may open the switches 751, 752, 753, 754, 755, 756, 757, and 758 while a radio signal is received from the array antenna 650.

According to an embodiment, the control module 620 may open or close the switches 751, 752, 753, 754, 755, 756, 757, and 758, while a radio signal is transmitted from the array antenna 650. For example, the control module 620 may open the switches 751, 752, 753, 754, 755, 756, 757, and 758 during the CLPC operation and the operation of adjusting the first parameter. For another example, the control module 620 may close the switches 751, 752, 753, 754, 755, 756, 757, and 758 during the operation of detecting the event and the operation of adjusting the second parameter.

Figure 7C:
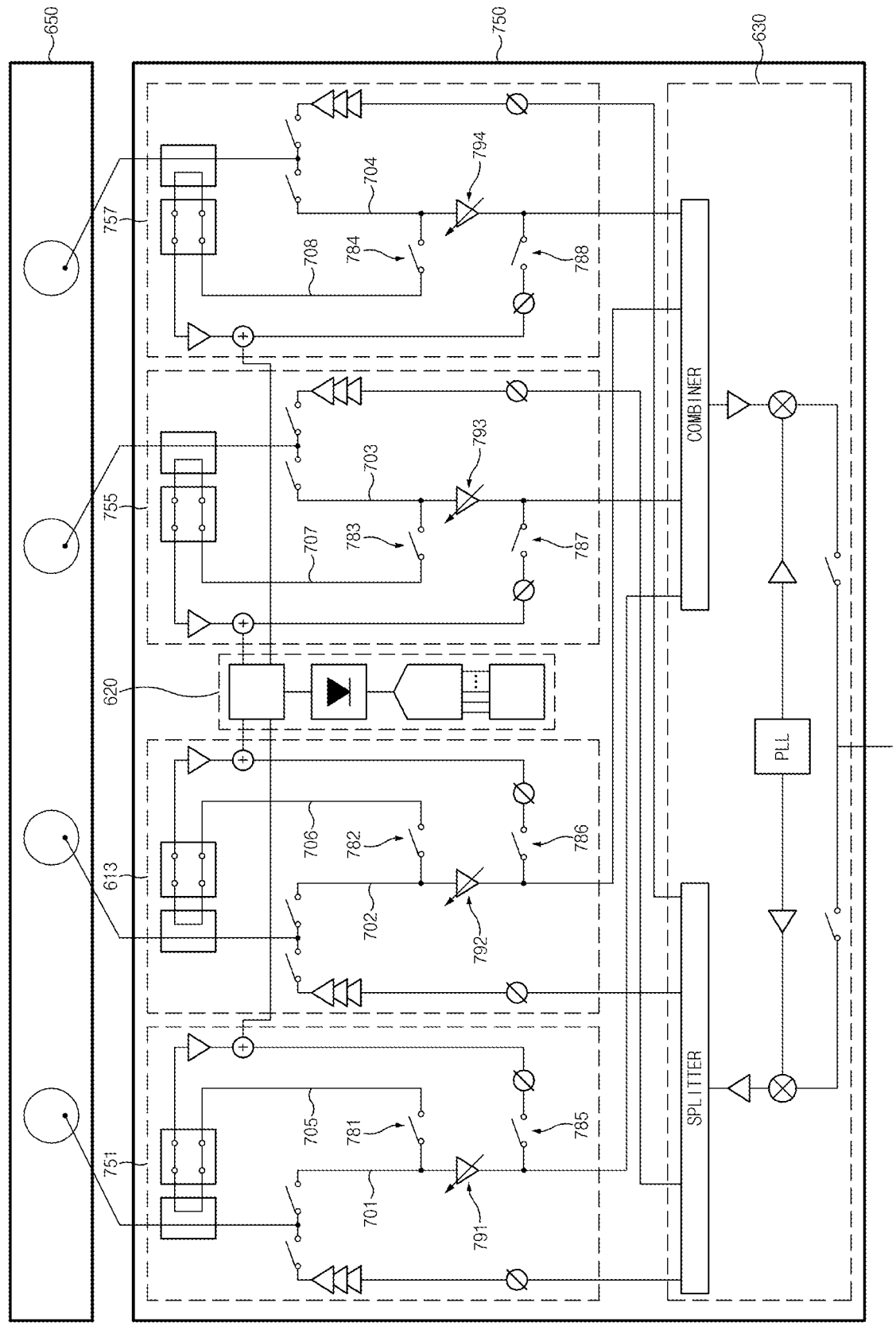
FIG. 7C illustrates an RFFE of an electronic device, and an array antenna, according to an example embodiment.

FIG. 7C illustrates an RFFE 770 and the array antenna 650 of an electronic device according to an example embodiment.

The RFFE 770 of FIG. 7C may have a structure in which relevant amplifiers 791, 792, 793, and 794 of four circuit modules 771, 773, 775, and 777 are shared between relevant receive paths 701, 702, 703, 704, and relevant second signal paths 705, 706, 707, and 708, as compared to the RFFE 600 of FIG. 6.

The control module 620 may control the open/closed state of the switches 781, 782, 783, 784, 785, 786, 787, and 788, such that amplifiers 791, 792, 793, and 794 are used on mutually different signal paths 701, 702, 703, 704, 705, 706, 707, and 708 during the transmit operation or the receive operation.

According to an embodiment, the control module 620 may open the switches 781, 782, 783, 784, 785, 786, 787, and 788 while a radio signal is received from the array antenna 650.

According to an embodiment, the control module 620 may open or close the switches 781, 782, 783, 784, 785, 786, 787, and 788, while a radio signal is transmitted from the array antenna 650. For example, the control module 620 may open the switches 781, 782, 783, 784, 785, 786, 787, and 788 during the CLPC operation and the operation of adjusting the first parameter. For another example, the control module 620 may close the switches 781, 782, 783, 784, 785, 786, 787, and 788 during the operation of detecting the event and the operation of adjusting the second parameter.

Figure 8:
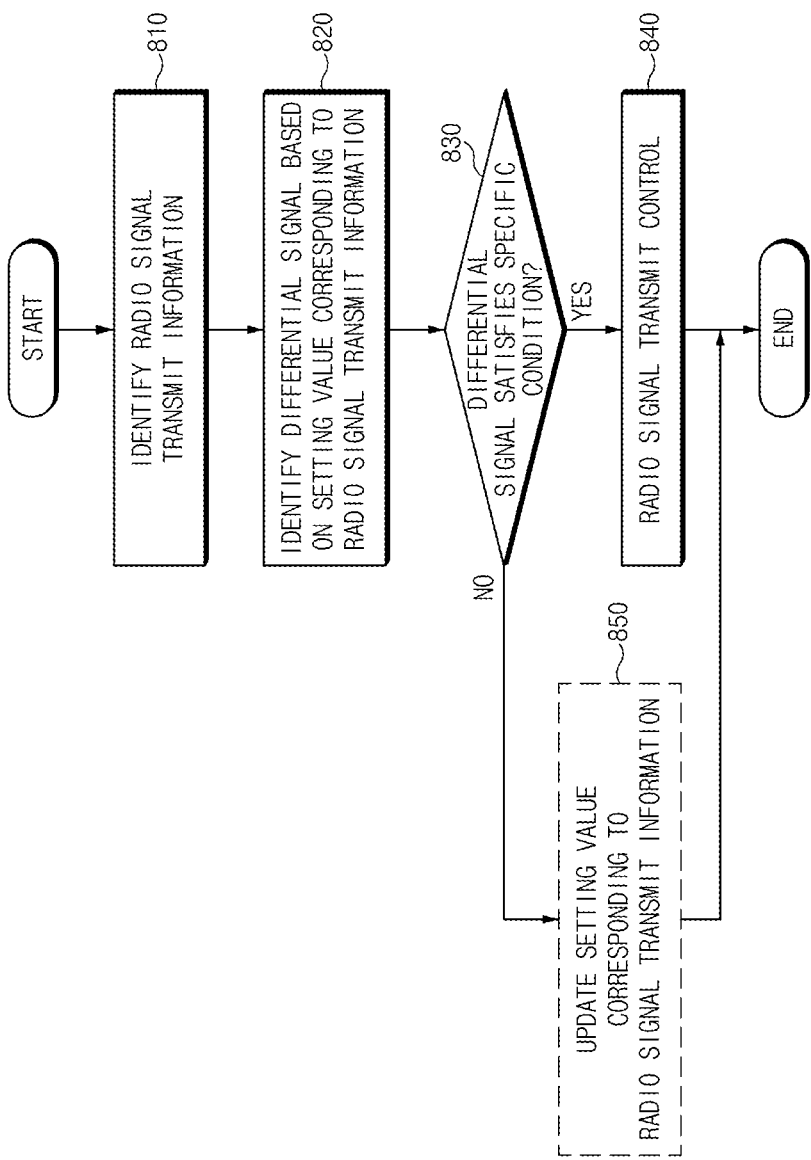
FIG. 8 is a flowchart illustrating an operation of detecting the event of an electronic device, according to an example embodiment.

FIG. 8 is a flowchart illustrating an operation of detecting the event of the electronic device 101, according to an example embodiment. The operations of FIG. 8 may be performed by the controller 270 of FIG. 2 and/or the communication processor 130.

Referring to FIG. 8, in operation 810, the controller 270 may identify radio signal transmit information. The radio signal transmit information may include information on an antenna (or an array antenna) to transmit a radio signal, a strength $P_{TX}$ of a transmit signal, and information on a frequency of the transmit signal.

For example, the controller 270 may identify that the radio signal having the specific frequency is transmitted through the first array antenna 171 of the plurality of array antennas 171, 173, 175, and 177. Thereafter, the controller 270 may identify the strength $P_{TX}$ of the radio signal through the CLPC operation for the first array antenna 171.

In operation 820, the controller 270 may identify a differential signal, based on a setting value corresponding to the radio signal transmit information. The setting value may be parameters indicated in tables (e.g., Tables 1 and 2) stored in the memory 287 of FIG. 2.

The controller 270 may identify the setting value corresponding to the radio signal transmit information, based on the tables corresponding to the first array antenna 171. The controller 270 may control the amplifier (e.g., the amplifier 253 of FIG. 2) and/or a phase shifter (e.g., the phase shifter 255 of FIG. 2), based on the identified setting value. For example, the controller 270 may set the gain "α" of the amplifier 253, and the phase shift "φ" of the phase shifter 255.

The controller 270 may control the switch 235 to perform the first switching connection, and control the switch 257 to be closed.

The controller 270 may identify a differential signal (or a digital signal having a normalized strength of the differential signal) through paths 331, 332, 333, 334, and 335 generated by controlling the switches 235 and 257.

In operation 830, the controller 270 may determine whether the differential signal satisfies a specific condition. For example, the determination on whether the specific condition of the differential signal is satisfied may be made based on a comparison result between the normalized strength of the differential signal and the reference strength $TH_{max}$.

According to an embodiment, when the normalized strength of the differential signal is lower than the reference strength $TH_{max}$, the controller 270 may determine that the differential signal satisfies the specific condition. According to an embodiment, when the normalized strength of the differential signal is not lower than the reference strength $TH_{max}$, the controller 270 may determine that the differential signal fails to satisfy the specific condition.

When the differential signal is determined as satisfying the specific condition (e.g., determined as "YES"), the controller 270 may perform operation 840.

When the differential signal is determined as not satisfying the specific condition (e.g., determined as "NO"), the controller 270 may perform operation 850. For example, when the normalized strength of the differential signal is less than or equal to the reference strength $TH_{floor}$, the controller 270 may selectively perform operation 850. According to an embodiment, the reference strength $TH_{floor}$ may be lower than the reference strength $TH_{max}$.

In operation 840, the controller 270 may control transmitting of a radio signal.

According to an embodiment, the controller 270 may reduce the strength $P_{TX}$ of the transmit signal. According to another embodiment, the controller 270 may change an antenna to output a transmit signal. For example, the controller 270 may output a transmit signal to the second array antenna 173, instead of the first array antenna 171

Operations 820, 830, and 840 may correspond to the operation of detecting the event described with reference to FIG. 3B.

In operation 850, the controller 270 may adjust the setting value corresponding to the radio signal transmit information. The controller 270 may update parameters, which correspond to the radio signal transmit information, of parameters shown in tables (e.g., table 1 and table 2) stored in the memory 287 of FIG. 2.

Operation 850 will be described below with reference to FIG. 9.

Operation 850 may correspond to an operation of adjusting a first parameter described with reference to FIG. 3C, and an operation of adjusting a second parameter described with reference to FIG. 3D.

Figure 9:
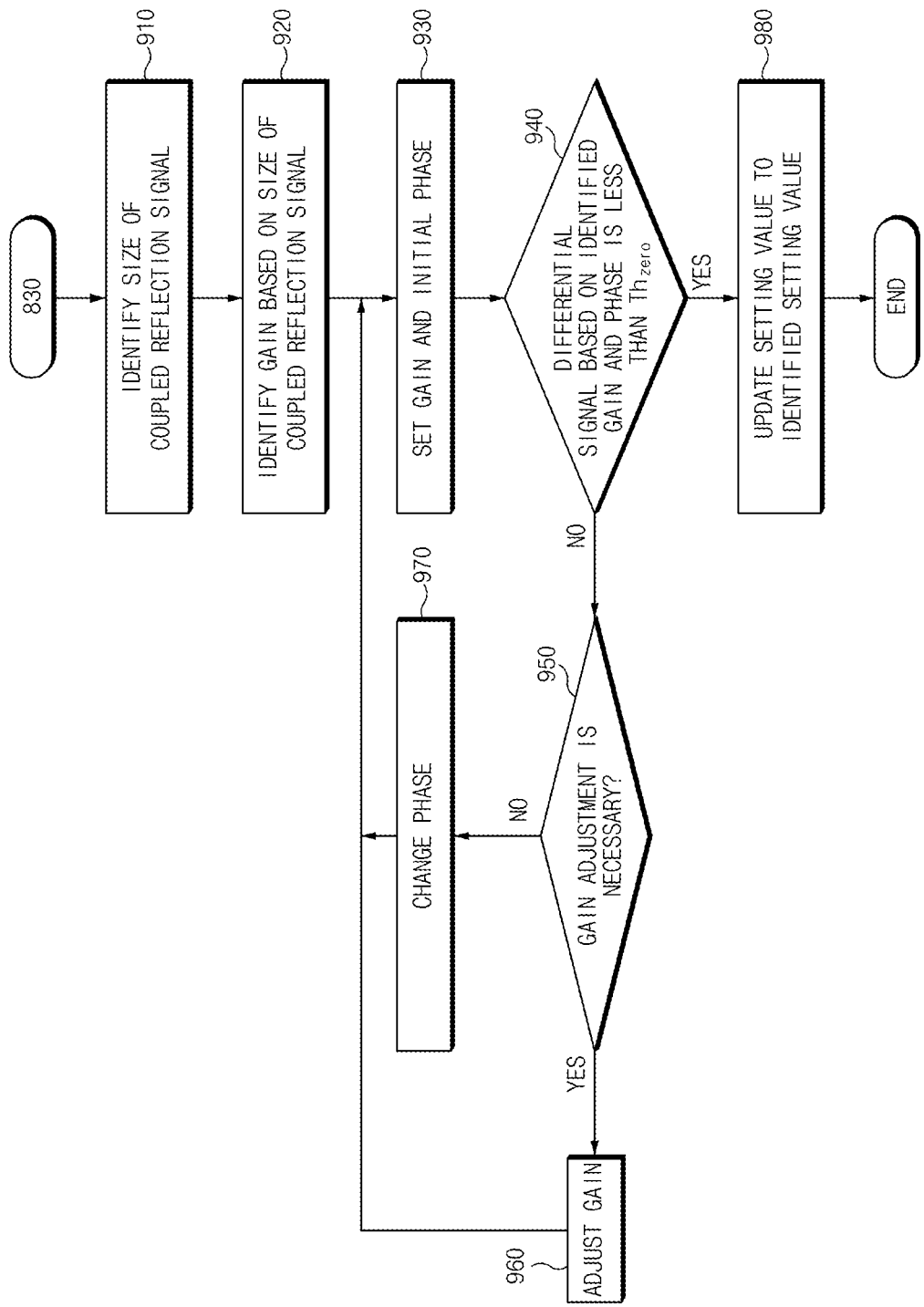
FIG. 9 is a flowchart illustrating an operation of adjusting a parameter of an electronic device, according to an example embodiment.

FIG. 9 is a flowchart illustrating an operation based on a parameter adjusting mode of an electronic device, according to an example embodiment. The operations of FIG. 9 may be included in operation 850 of FIG. 8. The operations of FIG. 9 may be performed by the controller 270 of FIG. 2 and/or the communication processor 130.

Referring to FIG. 9, in operation 910, the controller 270 may identify the size of the coupled reflection signal.

According to an embodiment, the controller 270 may control the switch 235 to perform the first switching connection and control the switch 257 to be open.

The controller 270 may identify the size of the coupled reflection signal through paths 351, 352, 353, and 354 generated by controlling the switches 215, 235, and 257.

In operation 920, the controller 270 may identify a gain, based on the size of the coupled reflection signal.

According to an embodiment, the controller 270 may identify the gain, based on the size of the coupled reflection signal and the coupling ratio.

Operation 910 and operation 920 may correspond to the operation of adjusting the first parameter described with reference to FIG. 3C.

In operation 930, the controller 270 may set the gain and the initial phase shift.

According to an embodiment, the controller 270 may set the identified gain "α" for the amplifier 253 in operation 920, and may set the initial phase shift (e.g., 0 degree) for the phase shifter 255.

In operation 940, the controller 270 may determine whether the differential signal (or a digital signal for the normalized strength of the differential signal) based on the identified gain and phase is less than the reference strength $TH_{Zero}$.

In operation 940, when the differential signal is less than the reference strength $TH_{Zero}$ (determined as "YES"), the controller 270 may perform operation 980. In operation 940, when the differential signal is equal to or greater than the reference strength $TH_{Zero}$ (determined as "NO"), the controller 270 may perform operation 950.

In operation 950, the controller 270 may determine when the gain needs to be adjusted.

According to an embodiment, when the strength of the identified differential signals are identified with respect to all phases at a present gain, and the strength of the identified differential signals is less than the reference strength $TH_{zero}$, the controller 270 may determine that the gain needs to be adjusted.

In operation 950, when it is determined that the gain needs to be adjusted (e.g., determined as "YES"), the controller 270 may perform operation 960. In operation 950, when it is determined that the gain does not needs to be adjusted (determined as "NO"), the controller 270 may perform operation 970.

In operation 960, the controller 270 may adjust a gain. According to an embodiment, the controller 270 may adjust the gain to a next gain. In this case, the next gain may be a gain obtained by increasing or decreasing the present gain by a specific size.

In operation 970, the controller 270 may change the phase shift. The controller 270 may change the phase shift to a next phase shift. In this case, the next phase shift may be a phase shift obtained by increasing or reducing the present phase shift by the specific size.

In operation 980, the controller 270 may update a setting value table using the identified setting value. The controller 270 may store the identified gain "α" and the identified phase shift "φ" in the memory 287. The controller 270 may store the identified gain "α" and the phase shift "φ" to the memory 287, in the FIFO scheme. The controller 270 may store the gain "α" and the phase shift "φ" with respect to entities, which correspond to the frequency of the transmit signal, in parameter tables (e.g., table 1 and table 2) stored in the memory 287.

Operations 930, 940, 950, 960, 970, and 980 may correspond to the operation of adjusting the second parameter described with reference to FIG. 3D.

Figure 10:
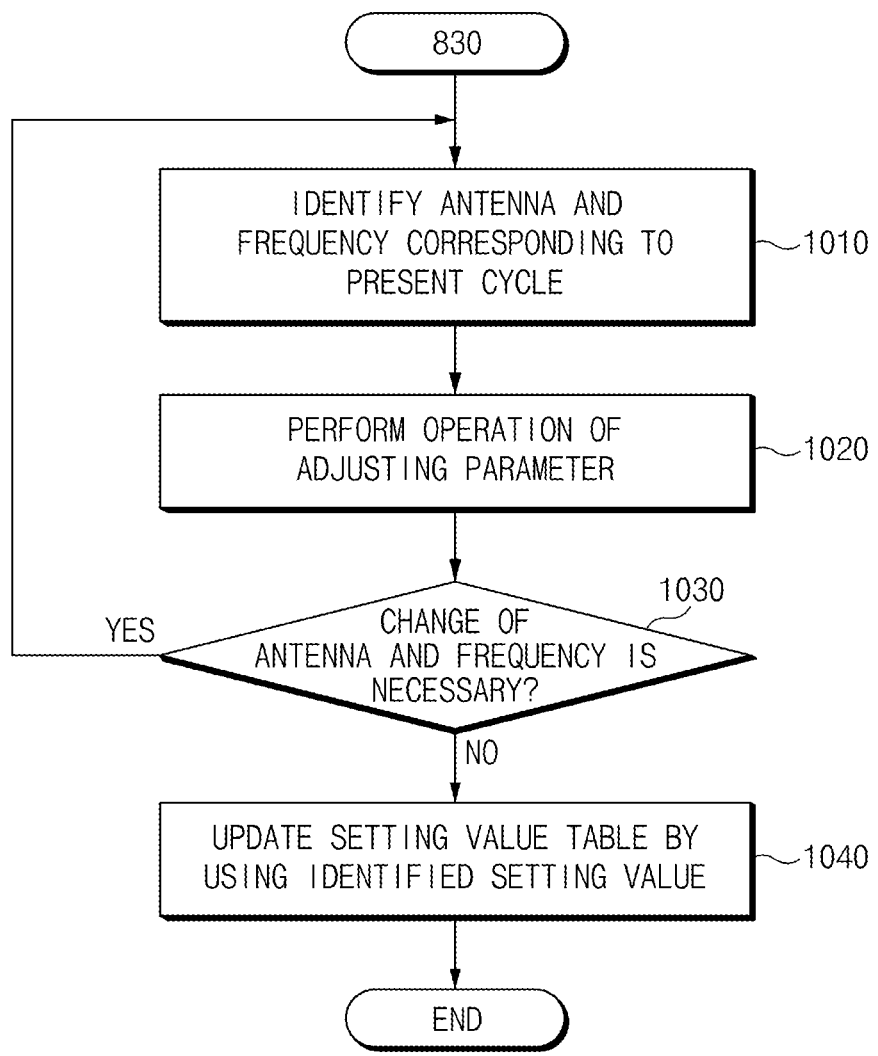
FIG. 10 is a flowchart illustrating a calibration operation of an electronic device, according to an example embodiment.

FIG. 10 is a flowchart illustrating a calibration operation of the electronic device, according to an example embodiment. The operations of FIG. 10 may be performed by the controller 270 of FIG. 2 and/or the communication processor 130.

Referring to FIG. 10, in operation 1010, the controller 270 may identify an antenna and a frequency corresponding to a present cycle. For example, the controller 270 may identify an i-th array antenna among the plurality of array antennas 171, 173, 175, and 177 and a j-th frequency among the plurality of frequencies. In this case, "i" may be an integer equal to or less than the number of the plurality of array antennas 171, 173, 175, and 177, and "j" may be an integer equal to or less than the number of frequency bands supported by at least one communication processor 130.

In operation 1020, the controller 270 may perform the operation of adjusting the parameter. The controller 270 may perform the operation of adjusting the parameter by performing operation 910 to operation 980 of FIG. 9.

In operation 1030, the controller 270 may determine whether the antenna or the frequency needs to be changed.

For example, when "M" number of parameters (that is, the gain and the phase shift) are obtained to correspond to the i-th array antenna and the j-th frequency, the controller 270 may determine that the antenna and the frequency need to be changed. In this case, "M" may indicate the number of parameters stored in the memory 287.

According to an embodiment, when "M" number of parameters (that is, the gain and the phase shift) are obtained with respect to the plurality of array antennas 171, 173, 175, and 177 and the plurality of frequencies, the controller 270 may determine that the antenna and the frequency do not need to be changed. For another example, when "i" indicates the number of the plurality of array antennas 171, 173, 175, and 177 and "j" indicates the number of frequency bands supported by the communication processor 130, the controller 270 may determine that the antenna and the frequency do not need to be changed.

In operation 1030, when it is identified that the antenna and the frequency needs to be changed (determined as "YES"), the controller 270 may perform operation 1010. In operation 1030, when it is identified that the antenna and the frequency do not need to be changed (determined as "NO"), the controller 270 may perform operation 1040.

In operation 1040, the controller 270 may update a setting value table using the identified setting value based on operation 1020.

The controller 270 adjusts a parameter for adjusting the gain (or amplification degree) of the amplifiers 251 and 253 based on the setting value identified in operation 1020, and parameters of adjusting the phase shift of the phase shifter 255 in the memory 287.

According to an example embodiment, an electronic device 101 may include an antenna 220, a power amplifier (PA) 213 to transmit an output signal to the antenna through a signal path 205, a coupler 230 to obtain a first signal coupled to the output signal and a second signal coupled to a reflection signal of the output signal reflected from the antenna 220, an equalizing module (comprising circuitry) configured to generate a changed signal obtained by changing a size and/or a phase of one signal of the first signal or the second signal, a differential circuit 259 to generate a differential signal between a remaining one signal of the first signal or the second signal and the changed signal, and a controller 270 to control transmitting of a radio signal, based on the differential signal.

According to an embodiment, the controller 270 of the electronic device 101 may be configured to control the transmitting of the radio signal, based on that a size of the differential signal exceeds a first size, which is specified.

According to an embodiment, the antenna 220 of the electronic device 101 may include at least two array antennas 171, 173, 175, and 177. The controller 270 may be configured to control the transmitting of the radio signal, by changing an antenna, which is to transmit the output signal, from a first array antenna of the at least two array antennas to a second array antenna of the at least two array antennas. The first array antenna 171 may be spaced apart from the second array antenna 173 by a specific spacing.

According to an embodiment, the controller 220 of the electronic device 101 may be configured to control a gain of the power amplifier 213 to control the transmitting of the radio signal.

According to an embodiment, the electronic device 101 may further include a switch 235 electrically connected, directly or indirectly, to the coupler 253. The equalizing module may include a first power amplifier 251 positioned on a first signal path 241 between a first output port of the switch 235 and a first input port of the differential circuit 259, a second power amplifier 253 positioned on a second signal path 253 between a second output port of the switch 235 and a second input port of the differential circuit 259, and a phase shifter 255 positioned on the second signal path 245.

According to an embodiment, the second power amplifier 253, 531, or 551 of the electronic device 101 is positioned on a signal path, in which a receive signal obtained from the antenna 220 is input to a communication processor 130, to amplify a size of the receive signal.

According to an embodiment, the phase shifter 255, 511, or 535 of the electronic device 101 is positioned on a signal path, in which a receive signal obtained from the antenna 220 is input to a communication processor 130, to change a phase of the receive signal.

According to an embodiment, the controller 270 of the electronic device 101 may be configured to determine a gain of the second power amplifier 235, based on a frequency of the output signal.

According to an embodiment, wherein the controller 270 of the electronic device 101 may be configured to determine a phase shift degree of the phase shifter, based on a frequency of the output signal.

According to an embodiment, the antenna of the electronic device 101 may include a plurality of antennas, and the controller 270 of the electronic device 101 may be configured to determine a gain of the second power amplifier and/or a phase shift degree of the phase shifter, based on an operating state of a first antenna, which transmits the output signal, of the plurality of antennas and at least one second antenna of the plurality of antennas except for the first antenna.

According to an embodiment, the controller 270 of the electronic device 101 may be configured to control the switch 235 to transmit the first signal to the differential circuit 259 through the first signal path 241, for a first sub-duration 421 or 441 of a transmit duration 413 or 433, and control the switch 235 to transmit the first signal to the differential circuit 259 through the second signal path 245, for a second sub-duration 423 or 443 of the transmit duration 413 or 433. The first sub-duration 421 or 441 is a duration to adjust power of the output signal, and the second sub-duration 423 or 443 is a duration to determine whether the transmitting of the radio signal is controlled.

According to an embodiment, the controller 270 of the electronic device 101 may be configured to identify a size of the second signal transmitted to the differential circuit 259 through the first signal path 241 for a third sub-duration 425 of the transmit duration, and identify a first parameter based on the identified size of the second signal. The third sub-duration 425 is a duration for identifying the first parameter associated with the second power amplifier 253.

According to an embodiment, the controller 270 (comprising processing circuitry) of the electronic device 101 may be configured to control the switch 235 to transmit the first signal to the differential circuit 259 through the second signal path 245, for a fourth sub-duration 427 of the transmit duration. The fourth sub-duration 427 may be a duration to identify the first parameter associated with the second power amplifier 253 and/or a second parameter associated with the phase shifter 255.

According to an embodiment, the controller 270 of the electronic device 101 may be configured to identify the first parameter and/or the second parameter for the fourth sub-duration 427, based on that a size of the differential signal, which is identified for the second sub-duration 423 or 443, is equal to or less than a second size which is specified.

According to an embodiment, the controller 270 of the electronic device 101 may be configured to identify the second parameter allowing the size of the differential signal to be equal to or less than the second size which is specified during the fourth sub-duration 427.

According to an embodiment, the controller 270 of the electronic device 101 may be configured to update a parameter table (e.g., table 1 or table 2), based on the identified first parameter and/or the identified second parameter. The parameter table may store a first parameter and a second parameter set for each of a plurality of operating frequencies.

According to an embodiment, the antenna of the electronic device 101 includes a plurality of antennas, and the parameter table of the electronic device 101 includes parameter tables for each of the plurality of antennas.

Each embodiment herein may be used in combination with any other embodiment(s) described herein.

According to an embodiment, a parameter table for a first antenna of the plurality of antennas of the electronic device 101 may store a first parameter and a second parameter set based on an operating state of at least one second antenna of the plurality of antennas except for the first antenna.

According to an example embodiment, a method for operating an electronic device 101 may include acquiring a first signal coupled to an output signal transmitted to an antenna 220 through a signal path 205, acquiring a second signal coupled to a reflection signal of the output signal, which is reflected from the antenna 220, generating a changed signal obtained by changing a size and/or a phase of one signal of the first signal or the second signal, generating a differential signal between a remaining one signal of the first signal or the second signal and the changed signal, and controlling transmitting of a radio signal, based on the differential signal. "Based on" as used herein covers based at least on.

According to an embodiment, the controlling of the transmitting of the radio signal may include controlling the transmitting of the radio signal, based on that a size of the differential signal exceeds a first size, which is specified.

According to an embodiment, a method for operating an electronic device may store, based on the size of the differential signal is equal to or less than a second size which is specified, identifying a first parameter associated with the size of one signal, identifying a second parameter associated with a phase of the one signal, and updating a parameter table (e.g., table 1 or table 2), based on the identified first parameter and/or the identified second parameter. The parameter table may store the first parameter and the second parameter set for each of the plurality of operating frequencies.

According to an embodiment, the identifying of the first parameter may include identifying the size of the second signal, and identifying the first parameter based on the identified size of the second signal.

According to an embodiment, the identifying of the second parameter may include identifying the second parameter, such that the size of the differential signal is equal to or less than the second size which is specified.

Figure 11:
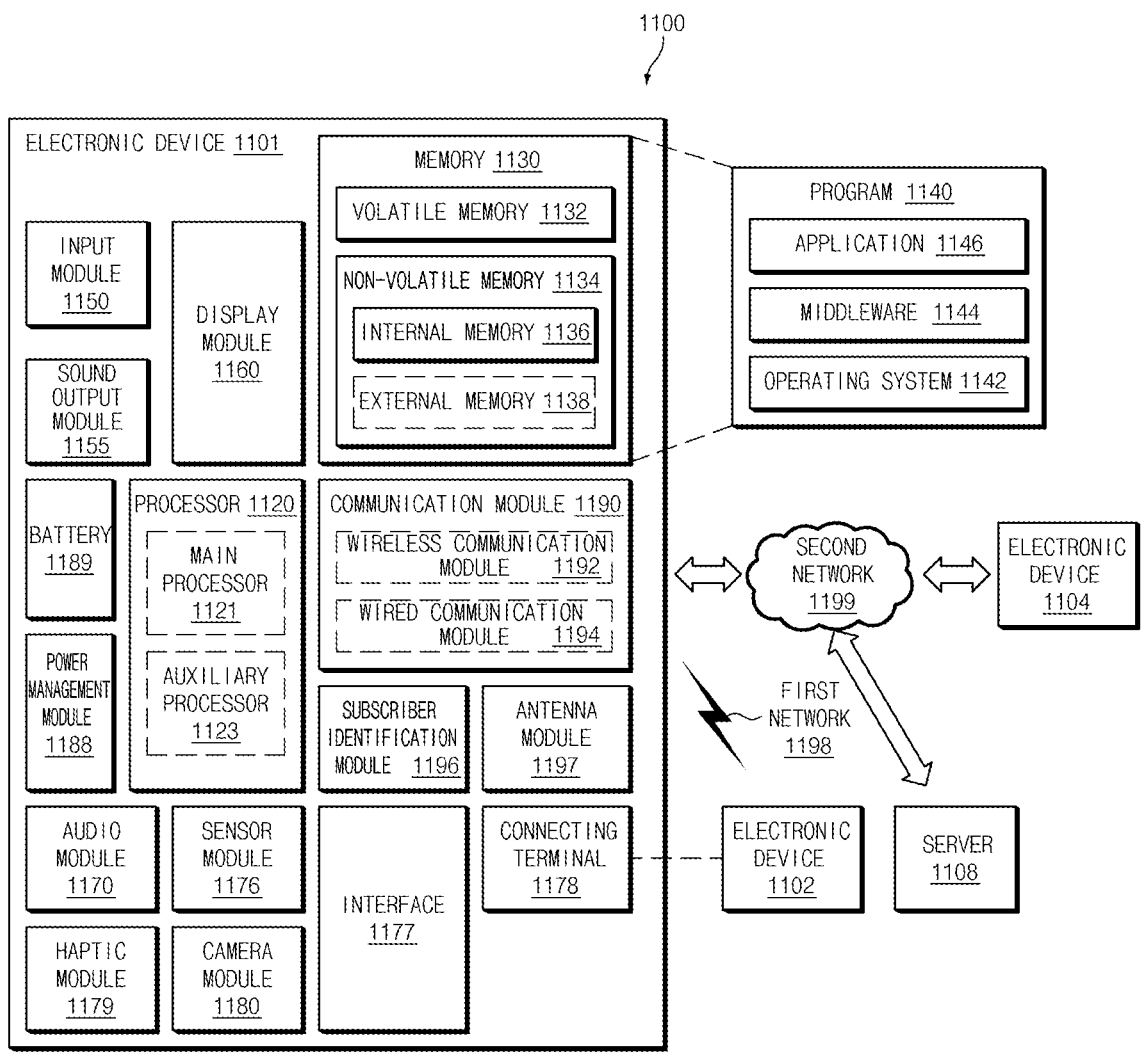
FIG. 11 is a block diagram illustrating an electronic device 1101 in a network environment 1100 according to various example embodiments.

FIG. 11 is a block diagram illustrating an electronic device 1101 in a network environment 1100 according to various embodiments. The electronic device of FIG. 11 may include the electronic device of FIG. 1.

Referring to FIG. 11, the electronic device 1101 in the network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module(SIM) 1196, or an antenna module 1197. In some embodiments, at least one of the components (e.g., the connecting terminal 1178) may be omitted from the electronic device 1101, or one or more other components may be added in the electronic device 1101. In some embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to an embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thererto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to an embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 1164 dB or less) for implementing mMTC, or U-plane latency (e.g., 0.5 ms or less for each of downlink (DL) and uplink (UL), or a round trip of 11 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In another embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various example embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While various example embodiments of the disclosure have been illustrated and described herein, it will be understood that the various example embodiments are intended to be illustrative, not limiting. One of ordinary skill in the art will understand that various changes in form and details may be made without departing from the true spirit and full scope of the disclosure as set forth, for example, in the appended claims and their equivalents. It will also be understood that each embodiment herein may be used in combination with any other embodiment(s) described herein.

The invention claimed is:

1. An electronic device comprising:
an antenna;
a power amplifier (PA) configured to transmit an output signal to the antenna through a signal path;
a coupler configured to obtain a first signal coupled to the output signal and a second signal coupled to a reflection signal of the output signal reflected from the antenna;
an equalizing module, comprising circuitry, configured to generate a changed signal obtained at least by changing a size and/or a phase of one signal of the first signal or the second signal;
a differential circuit configured to generate a differential signal between at least a remaining one signal of the first signal or the second signal, and the changed signal; and
a controller, comprising processing circuitry, configured to control transmission of a radio signal, based on the differential signal.

2. The electronic device of claim 1, wherein the controller is configured to:
control the transmission of the radio signal, based on that a size of the differential signal exceeds a first size.

3. The electronic device of claim 2, wherein the antenna includes at least two array antennas,
wherein the controller is configured to:
control the transmission of the radio signal, at least by changing an antenna, which is to transmit the output signal, from a first array antenna of the at least two array antennas, to a second array antenna of the at least two array antennas, and
wherein the first array antenna is spaced apart from the second array antenna.

4. The electronic device of claim 2, wherein the controller is configured to:
control a gain of the power amplifier at least to control the transmission of the radio signal.

5. The electronic device of claim 1, further comprising:
a switch electrically connected to the coupler,
wherein the equalizing module includes:
a first power amplifier positioned on a first signal path between at least a first output port of the switch and a first input port of the differential circuit;

a second power amplifier positioned on a second signal path between at least a second output port of the switch and a second input port of the differential circuit; and a phase shifter positioned on the second signal path.

6. The electronic device of claim 5, wherein the second power amplifier is positioned on a signal path, in which a receive signal to be obtained from the antenna is to be input to a communication processor, to amplify a size of the receive signal.

7. The electronic device of claim 5, wherein the phase shifter is positioned on a signal path, in which a receive signal to be obtained from the antenna is to be input to a communication processor, to change a phase of the receive signal.

8. The electronic device of claim 5, wherein the controller is configured to:

determine a gain of the second power amplifier, based on a frequency of the output signal.

9. The electronic device of claim 5, wherein the controller is configured to:

determine a phase shift degree of the phase shifter, based on a frequency of the output signal.

10. The electronic device of claim 5, wherein the antenna includes a plurality of antennas, and wherein the controller is configured to:

determine a gain of the second power amplifier and/or a phase shift degree of the phase shifter, based on an operating state of a first antenna, which transmits the output signal, of the plurality of antennas, and at least one second antenna of the plurality of antennas except for the first antenna.

11. The electronic device of claim 5, wherein the controller is configured to:

control the switch to transmit the first signal to the differential circuit through at least the first signal path, for a first sub-duration of a transmit duration, and control the switch to transmit the first signal to the differential circuit through at least the second signal path, for a second sub-duration of the transmit duration, wherein the first sub-duration is a duration to adjust power of the output signal, and wherein the second sub-duration is a duration to determine whether the transmission of the radio signal is controlled.

12. The electronic device of claim 11, wherein the controller is configured to:

identify a size of the second signal transmitted to the differential circuit through the first signal path for a third sub-duration of the transmit duration, and identify a first parameter based on the identified size of the second signal, wherein the third sub-duration is a duration for identifying the first parameter associated with the second power amplifier.

13. The electronic device of claim 12, wherein the controller is configured to:

control the switch to transmit the first signal to the differential circuit through at least the second signal path, for a fourth sub-duration of the transmit duration, and wherein the fourth sub-duration is a duration to identify the first parameter associated with the second power amplifier and/or a second parameter associated with the phase shifter.

14. The electronic device of claim 13, wherein the controller is configured to:

identify the first parameter and/or the second parameter for the fourth sub-duration, based on that a size of the differential signal, which is identified for the second sub-duration, is equal to or less than a second size which is specified.

15. The electronic device of claim 14, wherein the controller is configured to:

identify the second parameter for allowing the size of the differential signal to be equal to or less than the second size which is specified during the fourth sub-duration.

16. The electronic device of claim 15, wherein the controller is configured to:

update a parameter table, based on the identified first parameter and/or the identified second parameter, and wherein the parameter table is configured to store a first parameter and a second parameter set for each of a plurality of operating frequencies.

17. The electronic device of claim 16, wherein the antenna includes a plurality of antennas, and wherein the parameter table includes parameter tables for each of the plurality of antennas.

18. The electronic device of claim 17, wherein a parameter table for a first antenna of the plurality of antennas is to store a first parameter and a second parameter set based on an operating state of at least one second antenna of the plurality of antennas except for the first antenna.

19. A method for operating an electronic device, the method comprising:

acquiring a first signal coupled to an output signal transmitted to an antenna through a signal path, acquiring a second signal coupled to a reflection signal of the output signal, which is reflected from the antenna, generating a changed signal obtained by changing a size and/or a phase of at least one signal of the first signal or the second signal, generating a differential signal between one of signal of the first signal or the second signal, and the changed signal, and controlling transmitting of a radio signal, based on the differential signal.

20. The method of claim 19, wherein the controlling of the transmitting of the radio signal includes:

controlling the transmitting of the radio signal, based on that a size of the differential signal exceeds a first size.

* * * * *